United States Patent
Freeman et al.

(10) Patent No.: US 10,607,489 B2
(45) Date of Patent: Mar. 31, 2020

(54) METHODS AND APPARATUS FOR REDUCING PROBABILITIES OF COLLISIONS BETWEEN HUMANS AND AUTOMATED MACHINES OPERATING WITHIN A WORKPLACE

(71) Applicant: The Boeing Company, Chicago, IL (US)

(72) Inventors: Roland N. Freeman, Goose Creek, SC (US); Mark James Boyer, Huntington Beach, CA (US); David Wayne Nelson, Maple Valley, WA (US); Robert John Rencher, Normandy Park, WA (US); Brandon Edward Wickline, Hanahan, SC (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 15/666,258

(22) Filed: Aug. 1, 2017

(65) Prior Publication Data

US 2019/0043361 A1    Feb. 7, 2019

(51) Int. Cl.
*G08G 1/16* (2006.01)
*G05D 1/00* (2006.01)
*G05D 1/02* (2020.01)

(52) U.S. Cl.
CPC ........... *G08G 1/166* (2013.01); *G05D 1/0055* (2013.01); *G05D 1/0088* (2013.01); *G05D 1/0214* (2013.01); *G05D 1/0297* (2013.01); *G05D 2201/0216* (2013.01)

(58) Field of Classification Search
CPC combination set(s) only.
See application file for complete search history.

(56) References Cited

U.S. PATENT DOCUMENTS

| 6,405,132 B1* | 6/2002 | Breed | B60N 2/002 |
|---|---|---|---|
| | | | 701/117 |
| 9,269,255 B2* | 2/2016 | Beaulieu | B66C 13/40 |
| 9,896,030 B2* | 2/2018 | Sugimoto | B60Q 9/008 |

(Continued)

OTHER PUBLICATIONS

Antenova M2M, "Antenova Quick Guide—Radionova Antenna Modules," updated Apr. 2016, rev 2.1, 1 page.

(Continued)

*Primary Examiner* — Adam D Tissot
*Assistant Examiner* — Edward J Pipala
(74) *Attorney, Agent, or Firm* — Hanley, Flight & Zimmerman, LLC

(57) ABSTRACT

Methods and apparatus for reducing probabilities of collisions between humans and automated machines operating within a workplace are disclosed. An apparatus includes a collision probability determiner to determine a first probability of collision between an automated machine and a wearable safety vest. The apparatus further includes a safety manager to determine whether the first probability of collision exceeds a probability of collision threshold. The apparatus further includes a control signal generator to generate a first control signal in response to the safety manager determining that the first probability of collision exceeds the probability of collision threshold. The first control signal is to be transmitted to the automated machine to adjust an operation of the automated machine.

20 Claims, 12 Drawing Sheets

(56) References Cited

U.S. PATENT DOCUMENTS

| | | | | |
|---|---|---|---|---|
| 2008/0018472 | A1* | 1/2008 | Dasilva | G08B 25/016 340/572.4 |
| 2009/0222134 | A1* | 9/2009 | Franke | G05B 19/4061 700/251 |
| 2013/0142393 | A1* | 6/2013 | Lord | G06K 9/00671 382/105 |
| 2013/0311075 | A1* | 11/2013 | Tran | B60W 30/09 701/117 |
| 2015/0161872 | A1* | 6/2015 | Beaulieu | B66C 13/40 340/686.6 |
| 2016/0001775 | A1* | 1/2016 | Wilhelm | B60W 30/085 701/25 |
| 2016/0193999 | A1* | 7/2016 | Sasabuchi | B60T 7/22 701/301 |
| 2016/0318445 | A1* | 11/2016 | Sugimoto | B60Q 9/008 |

OTHER PUBLICATIONS

Antenova M2M, "Radionova RF Module, Part No. M10578-A2, Product Specification," Release Date Dec. 21, 2015, 21 pages.

PowerFilm Solar, "Solar Power without the sun," Brochure, 6 pages.

Phys.org, "Smart vests have construction workers' safety at heart," dated Mar. 16, 2017, retrieved from [https://phys.org/news/2016-03-smart-vests-workers-safety-heart.html] on Jun. 30, 2017, 4 pages.

Hodgkins, Kelly, "Virginia Tech has developed a smart safety vest that alerts road workers before a collision occurs," dated Sep. 8, 2015, retrieved from [https://www.digitaltrends.com/cool-tech/connected-safety-vest/] on Jun. 30, 2017, 4 pages.

Gogreensolar.com, "Orange Solar Vest," dated 2006-2017, retrieved from [https://www.gogreensolar.com/products/orange-solar-vest] on Jun. 30, 2017, 2 pages.

* cited by examiner

METHODS AND APPARATUS FOR REDUCING PROBABILITIES OF COLLISIONS BETWEEN HUMANS AND AUTOMATED MACHINES OPERATING WITHIN A WORKPLACE

FIELD OF THE DISCLOSURE

This disclosure relates generally to collision avoidance and, more particularly, to methods and apparatus for reducing probabilities of collisions between humans and automated machines operating within a workplace.

BACKGROUND

Workplaces such as manufacturing and/or shipping facilities are commonly populated by automated machines (e.g., automated guided vehicles and/or automated fixed position robots) as well as humans. Automated machines located and/or traveling within the workplace may be controlled by one or more tracking and/or guidance system(s) as the automated machines perform their respective operations. Such automated machines and the tracking and/or guidance system(s) that control the automated machines are unaware of humans that may be located and/or traveling within the workplace. Similarly, humans located and/or traveling within the workplace may be unaware of the automated machines located and/or traveling within the workplace. A lack of awareness among the automated machines and the humans collectively and/or concurrently operating within the workplace creates a potential for one or more harmful collisions involving one or more of the automated machines and one or more of the humans.

SUMMARY

Methods and apparatus for reducing probabilities of collisions between humans and automated machines operating within a workplace are disclosed. In some examples, an apparatus is disclosed. In some disclosed examples, the apparatus comprises a collision probability determiner to determine a first probability of collision between an automated machine and a wearable safety vest. In some disclosed examples, the apparatus comprises a safety manager to determine whether the first probability of collision exceeds a probability of collision threshold. In some disclosed examples, the apparatus comprises a control signal generator to generate a first control signal in response to the safety manager determining that the first probability of collision exceeds the probability of collision threshold. In some disclosed examples, the first control signal is to be transmitted to the automated machine to adjust an operation of the automated machine.

In some examples, a method is disclosed. In some disclosed examples, the method comprises determining, by executing one or more instructions with a processor, a first probability of collision between an automated machine and a wearable safety vest. In some disclosed examples, the method comprises generating, by executing one or more instructions with the processor, a first control signal in response to determining that the first probability of collision exceeds a probability of collision threshold. In some disclosed examples, the first control signal is to be transmitted to the automated machine to adjust an operation of the automated machine.

In some examples, a non-transitory machine readable storage medium comprising instructions is disclosed. In some disclosed examples, the instructions, when executed, cause a processor to determine a first probability of collision between an automated machine and a wearable safety vest. In some disclosed examples, the instructions, when executed, cause the processor to generate a first control signal in response to determining that the first probability of collision exceeds a probability of collision threshold. In some disclosed examples, the first control signal is to be transmitted to the automated machine to adjust an operation of the automated machine.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional tracking and/or guidance systems that control the respective movements and/or operations of automated machines (e.g., automated guided vehicles and/or automated fixed position robots) located and/or traveling within a workplace operate without knowledge, awareness, and/or control of humans that may also be located and/or traveling within the workplace. Similarly, humans located and/or traveling within the workplace may be operating without knowledge, awareness, and/or control of the automated machines located and/or traveling within the workplace. A lack of awareness among the automated machines and the humans collectively operating within the workplace creates a potential for one or more harmful collisions involving one or more of the automated machines and one or more of the humans.

Unlike the conventional tracking and/or guidance systems described above, methods and apparatus disclosed herein advantageously reduce probabilities of collisions between humans and automated machines operating within a workplace. In some examples, the disclosed methods and apparatus control the respective operations of one or more automated machine(s) located and/or traveling within a workplace based on location data and/or travel data collected, acquired, and/or received from one or more wearable safety vest(s) worn by and/or otherwise associated with corresponding ones of one or more human(s) located and/or traveling within the workplace, and further based on location data and/or travel data collected, acquired, and/or received from the one or more automated machine(s) located and/or traveling within the workplace. In some examples, the disclosed methods and apparatus additionally or alternatively control the presentation of one or more alert(s) at respective ones of the one or more wearable safety vest(s) located and/or traveling within the workplace based on the aforementioned location data and/or travel data associated with the one or more automated machine(s) and the one or more wearable safety vest(s).

Figure 1:
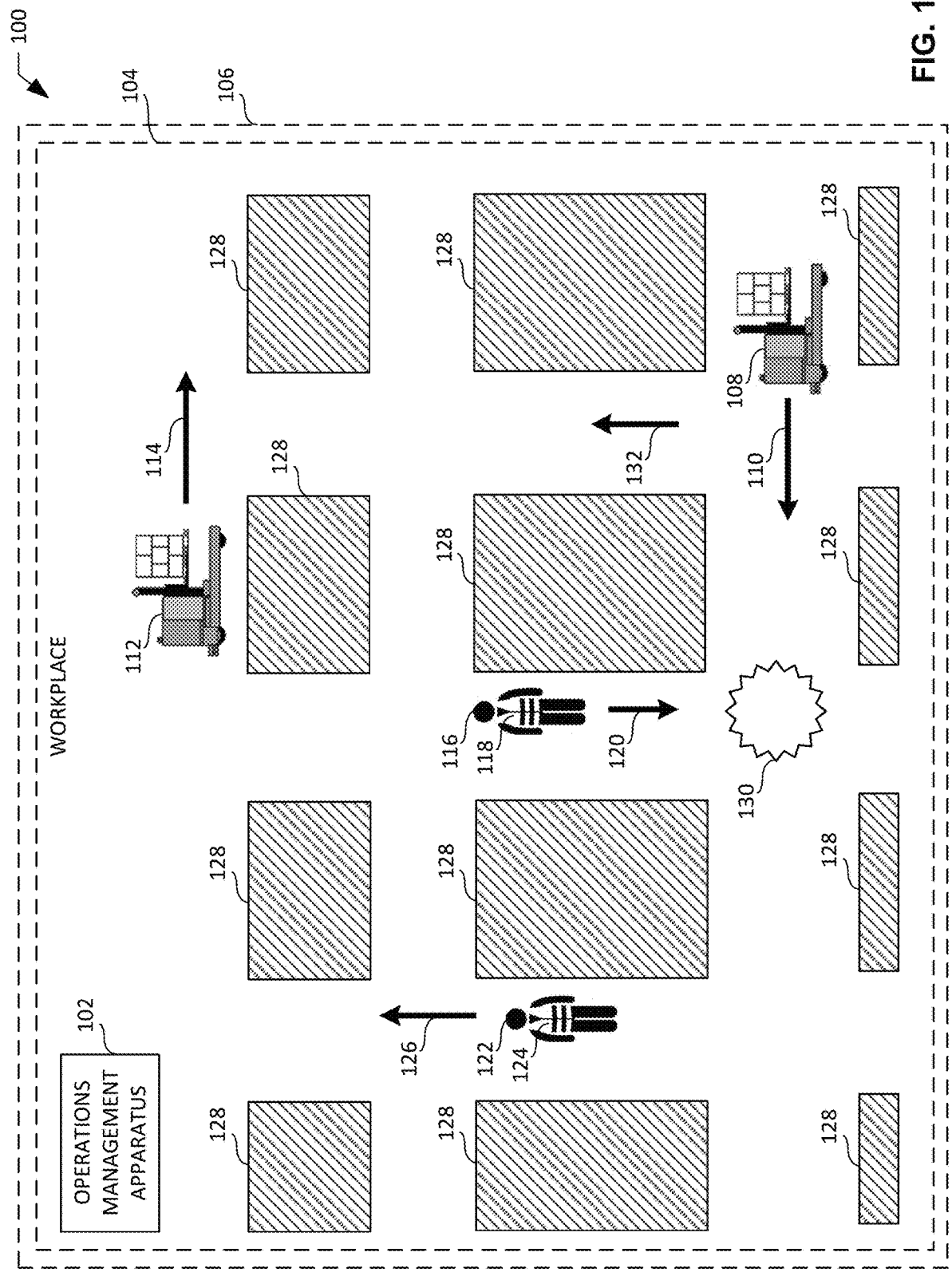
FIG. 1 illustrates an example environment of use in which an example operations management apparatus reduces probabilities of collisions between humans and automated machines operating within an example workplace.

FIG. 1 illustrates an example environment of use 100 in which an example operations management apparatus 102 reduces probabilities of collisions between humans and automated machines operating within an example workplace 104. The operations management apparatus 102 controls and/or manages respective operations of automated machines located and/or traveling within the workplace 104, and/or within an example geo-fence 106 associated with the workplace 104. In some examples, the operations management apparatus 102 also controls and/or manages respective operations of wearable safety vests to be worn by humans located and/or traveling within the workplace 104 and/or the geo-fence 106.

The workplace 104 of FIG. 1 may have any size, shape, layout, area and/or volume. The geo-fence 106 of FIG. 1 may also have any size, shape, layout, area and/or volume. In some examples, the geo-fence 106 may encompass the entirety of the workplace 104. In other examples, the geo-fence 106 may encompass less than the entirety (e.g., a portion) of the workplace 104. In the illustrated example of FIG. 1, the operations management apparatus 102 is located and/or positioned within the workplace 104 and within the geo-fence 106. In other examples, the operations management apparatus may be located and/or positioned remotely relative to one or both of the workplace 104 and/or the geo-fence 106. In some such other examples, a sub-system (not shown) of the operations management apparatus 102 may be located and/or positioned within the workplace 104 and/or within the geo-fence 106 to reduce latency associated with the operations management apparatus 102 transmitting and/or receiving data, communications, and/or control signals to and/or from automated machines and/or wearable safety vests located and/or traveling within the workplace 104 and/or the geo-fence 106.

The environment of use 100 of FIG. 1 includes a first example automated machine 108 traveling in a first example direction 110 within the workplace 104 and/or the geo-fence 106, and further includes a second example automated machine 112 traveling in a second example direction 114 within the workplace 104 and/or the geo-fence 106. In other examples, the environment of use 100 may include fewer (e.g., one) or more (e.g., five, ten, fifty, one hundred, etc.) automated machines traveling in respective associated directions within the workplace 104 and/or the geo-fence 106. In some examples, one or more of the automated machine(s) located within the workplace 104 and/or the geo-fence 106 may be stationary and/or have a fixed location.

In the illustrated example of FIG. 1, the first automated machine 108 and the second automated machine 112 are respectively implemented as automated guided vehicles. Automated machines to be tracked, monitored, controlled, and/or managed by the operations management apparatus of FIG. 1 may be implemented as any type of automated guided vehicle including, for example, an automated guided towing vehicle, an automated guided tugging vehicle, an automated guided unit loading vehicle, an automated guided pallet loading vehicle, or an automated guided forklift vehicle. Automated machines to be tracked, monitored, controlled, and/or managed by the operations management apparatus of FIG. 1 may alternatively be implemented as any type of automated fixed position (e.g., stationary) robot including, for example, a six-axis robot.

In the illustrated example of FIG. 1, the operations management apparatus 102 tracks and/or monitors the respective locations and/or travel of the automated machines (e.g., the first automated machine 108 and/or the second automated machine 112) located and/or traveling within the workplace 104 and/or the geo-fence 106. The operations management apparatus 102 of FIG. 1 also controls and/or manages respective operations of the automated machines located and/or traveling within the workplace 104 and/or the geo-fence 106. For example, the operations management apparatus 102 may control and/or instruct the first automated machine 108 to travel in the first direction 110 within the workplace 104 and/or the geo-fence 106 at a first rate of travel. In some such examples, the operations management apparatus 102 may control and/or instruct the first automated machine 108 to travel within the workplace 104 and/or geo-fence 106 along a first pathway (not shown) that includes the first direction 110. As another example, the operations management apparatus 102 may control and/or instruct the first automated machine 108 to perform one or more operation(s) associated with the movement, handling and/or treatment of material(s) and/or item(s) within the workplace 104 and/or the geo-fence 106. Examples of such operation(s) may include a picking operation, a placing operation, a loading operation, an unloading operation, a welding operation, a cutting operation, an assembly operation, etc. In some examples, the operations management apparatus 102 may be integrated within a tracking and guidance system such as that described in U.S. patent application Ser. No. 15/258,554 filed on Sep. 7, 2016, and titled "Analysis of Object Movement within an Environment," the entirety of which is hereby incorporated by reference herein.

The environment of use 100 of FIG. 1 further includes a first example human 116 wearing a first example wearable safety vest 118 traveling (e.g., as the first human 116 travels) in a third example direction 120 within the workplace 104 and/or the geo-fence 106. The environment of use 100 of FIG. 1 further includes a second example human 122 wearing a second example wearable safety vest 124 traveling (e.g., as the second human 122 travels) in a fourth example direction 126 within the workplace 104 and/or the geo-fence 106. In other examples, the environment of use 100 may include fewer (e.g., one) or more (e.g., five, ten, fifty, one hundred, etc.) humans wearing wearable safety vests and traveling in respective associated directions within the workplace 104 and/or the geo-fence 106. In some examples, one or more of the wearable safety vest(s) located and/or positioned within the workplace 104 and/or the geo-fence 106 may be stationary (e.g., as a result of one or more corresponding human(s) wearing such wearable safety vest(s) being stationary). The first wearable safety vest 118 and the second wearable safety vest 124 of FIG. 1 may be implemented as any type of wearable safety vest including, for example, a brightly-colored (e.g., neon, fluorescent, etc.) wearable safety vest having reflective material (e.g., one or more reflective strip(s) and/or area(s)) coupled to and/or integrated with an exterior surface of the wearable safety vest.

In the illustrated example of FIG. 1, the operations management apparatus 102 tracks and/or monitors the respective locations and/or travel of the wearable safety vests (e.g., the first wearable safety vest 118 and/or the second wearable safety vest 124) located and/or traveling within the workplace 104 and/or the geo-fence 106. The operations management apparatus 102 of FIG. 1 also controls and/or manages respective operations of the wearable safety vests located and/or traveling within the workplace 104 and/or the geo-fence 106. For example, the operations management apparatus 102 may control and/or instruct the first wearable safety vest 118 to present one or more alert(s) (e.g., a visual alert, an audible alert, a tactile alert, etc.) to the first human 116 traveling in the third direction 120 within the workplace 104 and/or the geo-fence 106.

The environment of use 100 of FIG. 1 further includes one or more example obstacle(s), structure(s) and/or restricted travel area(s) 128 located and/or positioned within the workplace 104 and/or the geo-fence 106. The environment of use 100 may include any number (e.g., zero, one, five, ten, fifty, etc.) of obstacle(s), structure(s) and/or restricted travel area(s) 128 located and/or positioned within the workplace 104 and/or the geo-fence 106, and respective ones of the obstacle(s), structure(s) and/or restricted travel area(s) 128 so located may be of any size, shape, layout, area and/or volume. In the illustrated example of FIG. 1 respective ones of the automated machines (e.g., the first automated machine 108 and the second automated machine 112) and the wearable safety vests (e.g., the first wearable safety vest 118 and the second wearable safety vest 124) may be prevented and/or otherwise prohibited (e.g., by one or more control signal(s) generated by the operations management apparatus 102, by a physical structure such as a barricade or a rail, by a safety policy associated with the workplace 104, etc.) from traveling onto, through a portion of, and/or over the obstacle(s), structure(s) and/or restricted travel area(s) 128 located and/or positioned within the workplace 104 and/or the geo-fence 106. Thus, movement(s) of respective ones of the automated machines and/or the wearable safety vests may be limited to movement(s) occurring in direction(s) and/or along path(s) that pass around the obstacle(s), structure(s) and/or restricted travel area(s) 128 located and/or positioned within the workplace 104 and/or the geo-fence 106.

In the illustrated example of FIG. 1, the operations management apparatus 102 determines collision probabilities (e.g., collision probability data) associated with a likelihood of a collision between respective ones of the automated machines located and/or traveling within the workplace 104 and/or the geo-fence 106 (e.g., the first automated machine 108, the second automated machine 112, etc.) and respective ones of the wearable safety vests located and/or traveling within the workplace 104 and/or the geo-fence 106 (e.g., the first wearable safety vest 118, the second wearable safety vest 124, etc.). In some examples, the operations management apparatus 102 of FIG. 1 may determine the collision probabilities based on location data collected, received, and/or obtained from the respective ones of the automated machines and/or the wearable safety vests located and/or traveling within the workplace 104 and/or the geo-fence 106. In some such examples, the operations management apparatus 102 may derive travel data (e.g., data including locations, directions of travel, and rates of travel for respective ones of the wearable safety vests and/or the automated machines) from the location data, and such travel data may serve as input data for one or more collision probability algorithm(s) implemented by the operations management apparatus 102 to determine the collision probabilities.

For example, the operations management apparatus 102 of FIG. 1 may determine the probability of a collision occurring at an example collision location 130 of FIG. 1 between the first automated machine 108 and the first human 116 wearing the first wearable safety vest 118 of FIG. 1. The operations management apparatus 102 may determine such collision probability based on the location of the first automated machine 108, the first direction 110 of travel of the first automated machine 108, the rate of travel of the first automated machine 108, the location of the first wearable safety vest 118, the third direction 120 of travel of the first wearable safety vest 118, and the rate of travel of the first wearable safety vest 118. The operations management apparatus 102 may implement a collision probability algorithm for which the location of the first automated machine 108, the first direction 110 of travel of the first automated machine 108, the rate of travel of the first automated machine 108, the location of the first wearable safety vest 118, the third direction 120 of travel of the first wearable safety vest 118, and/or the rate of travel of the first wearable safety vest 118 is/are input data, and for which the resultant collision probability is output data.

In the illustrated example of FIG. 1, the operations management apparatus 102 may determine that the probability of a collision between the first automated machine 108 traveling in the first direction 110 and the first human 116 wearing the first wearable safety vest 118 and traveling in the third direction 120 of FIG. 1 is substantially greater than the probability of a collision between the first automated machine 108 traveling in the first direction 110 and the second human 122 wearing the second wearable safety vest 124 and traveling in the fourth direction 126. The operations management apparatus 102 of FIG. 1 may further determine that the probability of a collision between the first automated machine 108 traveling in the first direction 110 and the first human 116 wearing the first wearable safety vest 118 and traveling in the third direction 120 of FIG. 1 is also substantially greater than the probability of a collision between the second automated machine 112 traveling in the second direction 114 and the first human 116 wearing the first wearable safety vest 118 and traveling in the third direction 120. The operations management apparatus 102 of FIG. 1 may further determine that the probability of a collision between the first automated machine 108 traveling in the first direction 110 and the first human 116 wearing the first wearable safety vest 118 and traveling in the third direction 120 of FIG. 1 is also substantially greater than the probability of a collision between the second automated machine 112 traveling in the second direction 114 and the second human 122 wearing the second wearable safety vest 124 and traveling in the fourth direction 126.

The operations management apparatus 102 of FIG. 1 compares respective ones of the determined collision probabilities to a collision probability threshold. In response to determining that one or more of the compared collision probabilities exceed(s) the collision probability threshold, the operations management apparatus 102 of FIG. 1 generates one or more control signal(s) to be transmitted to respective ones of the automated machine(s) associated with the excessive one(s) of the collision probabilities. The control signal(s) generated by the operations management apparatus 102 of FIG. 1 and transmitted to the automated machine(s) associated with the excessive one(s) of the collision probabilities is/are to adjust one or more operation(s) of such automated machine(s) to reduce the probability of collision between such automated machine(s) and one or more human(s) wearing the wearable safety vest(s) located and/or traveling within the workplace 104 and/or the geo-fence 106.

For example, the operations management apparatus 102 of FIG. 1 may determine that a collision probability associated with a likelihood of a collision between the first automated machine 108 of FIG. 1 and the first human 116 wearing the first wearable safety vest 118 of FIG. 1 exceeds a collision probability threshold. In response to making such a determination, the operations management apparatus 102 of FIG. 1 may generate one or more control signal(s) to be transmitted to the first automated machine 108 of FIG. 1 to adjust one or more operation(s) of the first automated machine 108. In some examples, the transmitted control signal(s) may cause the first automated machine 108 to cease and/or stop a travel operation associated with the first automated machine 108. In some examples, the transmitted control signal(s) may cause the first automated machine 108 to travel in an example alternate direction 132 of FIG. 1 that differs from a current direction of travel (e.g., the first direction 110 of FIG. 1) associated with the first automated machine 108. In some examples, the transmitted control signal(s) may cause the first automated machine 108 to travel at an alternate rate (e.g., a slower or faster rate) that differs from a current rate of travel associated with the first automated machine 108. In some examples, the transmitted control signal(s) may cause the first automated machine 108 to travel along an example alternate pathway that differs from a current pathway of travel associated with the first automated machine 108.

In response to determining that one or more of the compared collision probabilities exceed(s) the collision probability threshold, the operations management apparatus 102 of FIG. 1 additionally and/or alternatively generates one or more control signal(s) to be transmitted to respective ones of the wearable safety vest(s) associated with the excessive one(s) of the collision probabilities. In some examples, the operations management apparatus 102 generates the one or more control signal(s) to be transmitted to the respective ones of the wearable safety vest(s) associated with the excessive one(s) of the collision probabilities after first determining that the one or more control signal(s) transmitted to the respective ones of the automated machine(s) associated with the excessive one(s) of the collision probabilities did not reduce the excessive one(s) of the collision probabilities below the collision probability threshold. The control signal(s) generated by the operations management apparatus 102 of FIG. 1 and transmitted to the wearable safety vest(s) associated with the excessive one(s) of the collision probabilities is/are to present one or more alert(s) at such wearable safety vest(s) to reduce the probability of collision between one or more human(s) wearing such wearable safety vest(s) and one or more automated machines located and/or traveling within the workplace 104 and/or the geo-fence 106.

For example, the operations management apparatus 102 of FIG. 1 may determine that a collision probability associated with a likelihood of a collision between the first automated machine 108 of FIG. 1 and the first human 116 wearing the first wearable safety vest 118 of FIG. 1 exceeds a collision probability threshold. In response to making such a determination, the operations management apparatus 102 of FIG. 1 may generate one or more control signal(s) to be transmitted to the first wearable safety vest 118 of FIG. 1 to present one or more alert(s) at the first wearable safety vest 118. In some examples, the transmitted control signal(s) may cause the first wearable safety vest 118 to present one or more visual alert(s) via one or more light emitting diode(s) and/or display screen(s) coupled to and/or incorporated into the first wearable safety vest 118. In some examples, the transmitted control signal(s) may cause the first wearable safety vest 118 to present one or more audible alert(s) via one or more speaker(s) coupled to and/or incorporated into the first wearable safety vest 118. In some examples, the transmitted control signal(s) may cause the first wearable safety vest 118 to present one or more tactile alert(s) via one or more haptic component(s) coupled to and/or incorporated into the first wearable safety vest 118.

Additional details by which the operational management apparatus 102, the first automated machine 108, the second automated machine 112, the first wearable safety vest 118, and/or the second wearable safety vest 124 of the illustrated example of FIG. 1 may be implemented are provided herein in connection with FIGS. 2-5, 6A, 6B, and 7-11.

Figure 2:
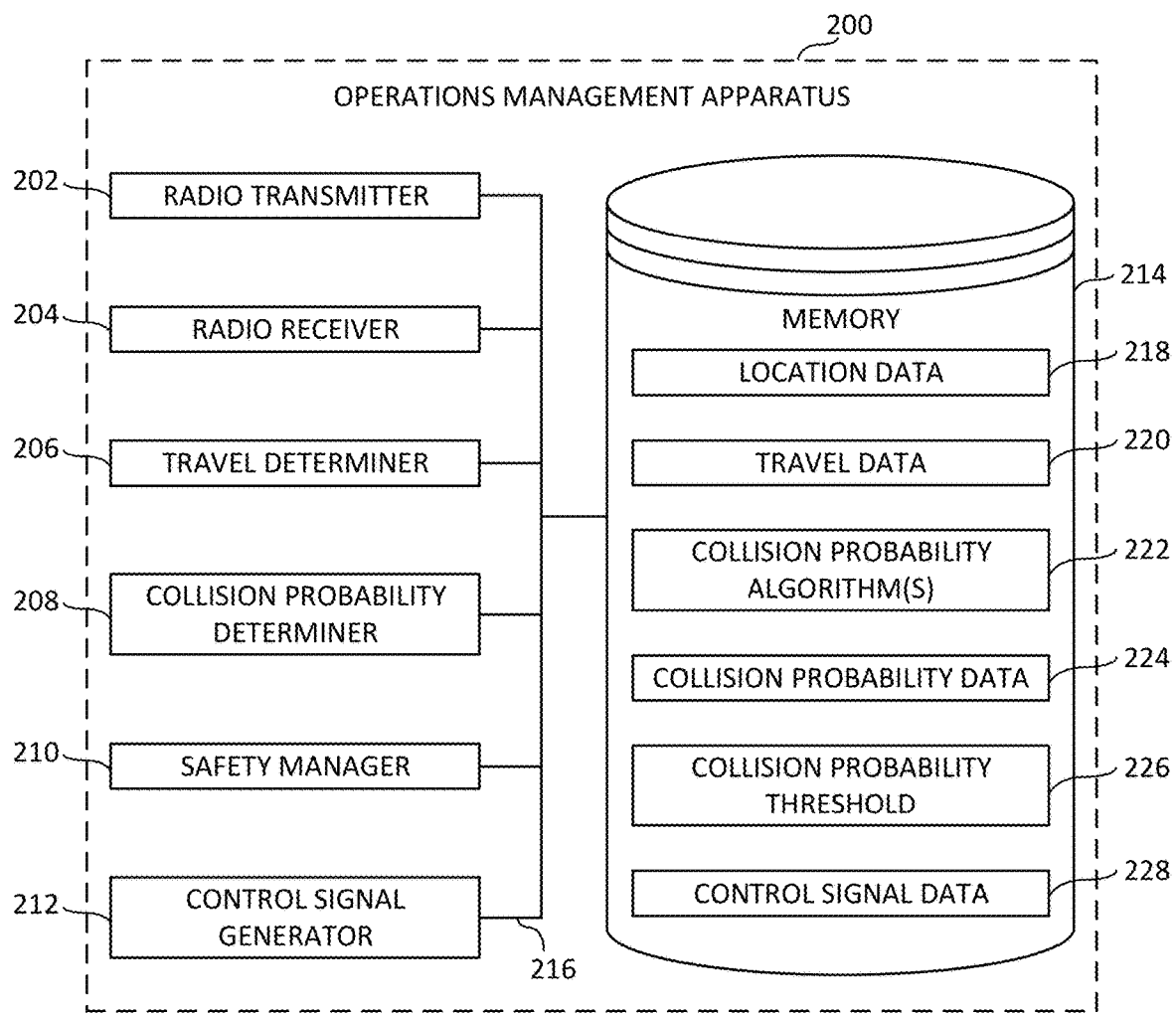
FIG. 2 is a block diagram of an example operations management apparatus constructed in accordance with the teachings of this disclosure.

FIG. 2 is a block diagram of an example operations management apparatus 200 constructed in accordance with the teachings of this disclosure. The operations management apparatus 102 of FIG. 1 described above may be implemented via the example operations management apparatus 200 of FIG. 2. The operations management apparatus 200 of FIG. 2 includes an example radio transmitter 202, an example radio receiver 204, an example travel determiner 206, an example collision probability determiner 208, an example safety manager 210, an example control signal generator 212, and an example memory 214. Respective ones of the radio transmitter 202, the radio receiver 204, the travel determiner 206, the collision probability determiner 208, the safety manager 210, the control signal generator 212, and the memory 214 of FIG. 2 are operatively coupled to one another via an example network and/or communication bus 216. The memory 214 of FIG. 2 stores example location data 218, example travel data 220, one or more example collision probability algorithm(s) 222, example collision probability data 224, an example collision probability threshold 226, and example control signal data 228.

The radio transmitter 202 of FIG. 2 transmits data and/or one or more signal(s) to one or more automated machine(s) and/or one or more wearable safety vest(s) located and/or traveling within a workplace and/or a geo-fence. For example, the radio transmitter 202 of FIG. 2 may transmit data and/or one or more signal(s) to the automated machine 300 of FIG. 3 and/or the wearable safety vest 400 of FIG. 4. In some examples, the data and/or signal(s) transmitted by the radio transmitter 202 of FIG. 2 to the automated machine(s) and/or the wearable safety vest(s) is/are communicated via a network such as a wireless network, a radio network, a cellular network, etc.

In some examples, the radio transmitter 202 of FIG. 2 may transmit control signal data (e.g., the control signal data 228 of FIG. 2). In some examples, the control signal data transmitted by the radio transmitter 202 of FIG. 2 to an automated machine (e.g., the automated machine 300 of FIG. 3) is to cause the automated machine to adjust one or more operation(s) of the automated machine. In some examples, the control signal data transmitted by the radio transmitter 202 of FIG. 2 to a wearable safety vest (e.g., the wearable safety vest 400 of FIG. 4) is to cause the wearable safety vest to present one or more alert(s) at the wearable safety vest. Data corresponding to the signal(s) to be transmitted by the radio transmitter 202 of FIG. 2 may be of any type, form and/or format, and may be stored in a computer-readable storage medium such as the memory 214 of FIG. 2 described below.

The radio receiver 204 of FIG. 2 collects, acquires and/or receives data and/or one or more signal(s) from one or more automated machine(s) and/or one or more wearable safety vest(s) located and/or traveling within a workplace and/or a geo-fence. For example, the radio receiver 204 of FIG. 2 may collect, acquire and/or receive data and/or one or more signal(s) from the automated machine 300 of FIG. 3 and/or the wearable safety vest 400 of FIG. 4. In some examples, the data and/or signal(s) received by the radio receiver 204 of FIG. 2 from the automated machine(s) and/or the wearable safety vest(s) is/are communicated via a network such as a wireless network, a radio network, a cellular network, etc.

In some examples, the radio receiver 204 of FIG. 2 may receive data and/or signal(s) corresponding to location data (e.g., the location data 218 of FIG. 2). In some examples, the received location data may include location data associated with the automated machine 300 of FIG. 3 (e.g., the location data 318 of FIG. 3 described below). In some examples, the received location data may include location data associated with the wearable safety vest 400 of FIG. 4 (e.g., the location data 418 of FIG. 4 described below). Data identified and/or derived from the signal(s) collected and/or received by the radio receiver 204 of FIG. 2 may be of any type, form and/or format, and may be stored in a computer-readable storage medium such as the memory 214 of FIG. 2 described below.

The travel determiner 206 of FIG. 2 determines travel data (e.g., the travel data 220 of FIG. 2) for the automated machine(s) and/or the wearable safety vest(s) based on the collected, acquired and/or received located data. For example, the travel determiner 206 of FIG. 2 may determine travel data associated with the automated machine 300 of FIG. 3 and/or the wearable safety vest 400 of FIG. 4 based on the location data (e.g., the location data 218 of FIG. 2) collected, acquired and/or received via the radio receiver 204 of FIG. 2.

Figure 3:
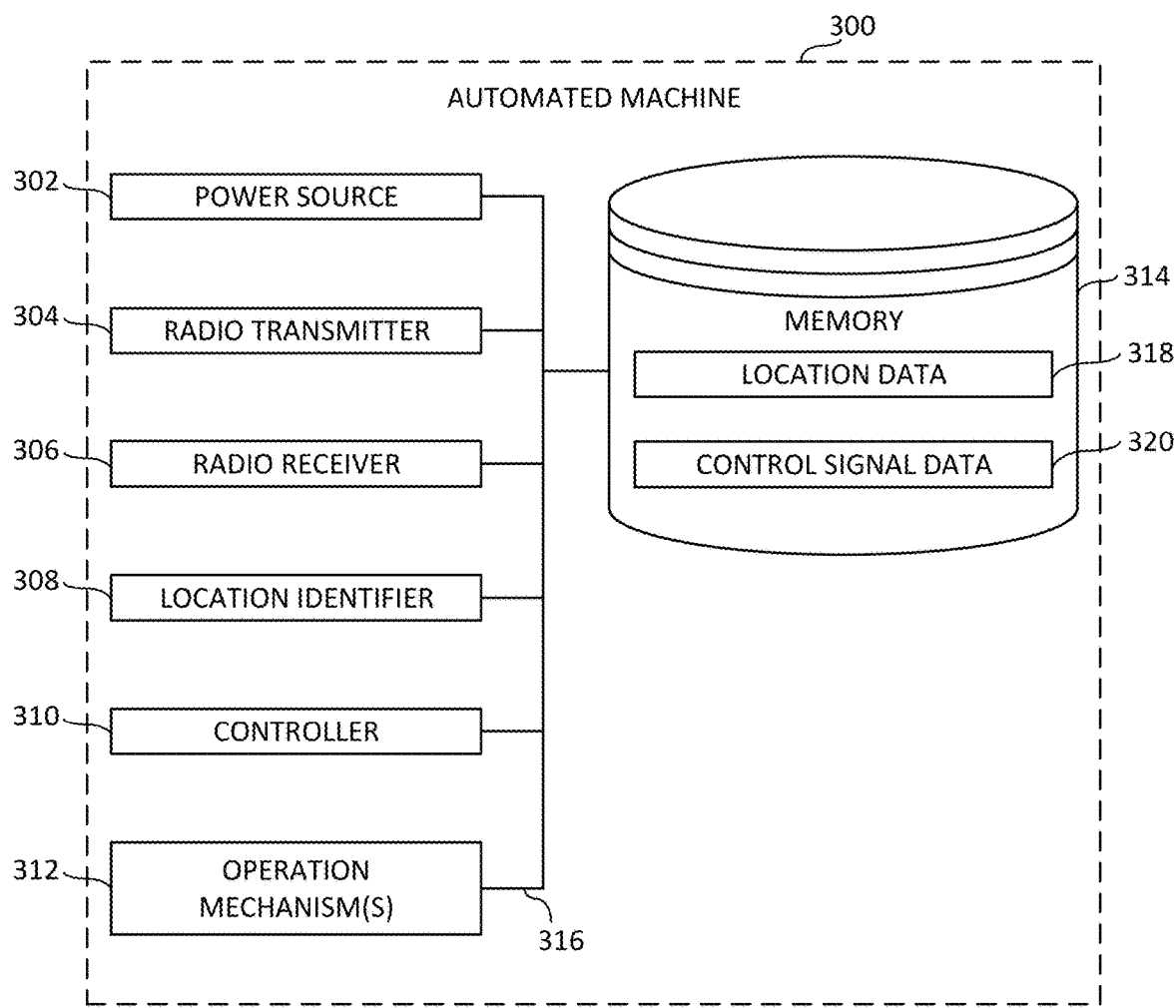
FIG. 3 is a block diagram of an example automated machine constructed in accordance with the teachings of this disclosure.
Figure 3:
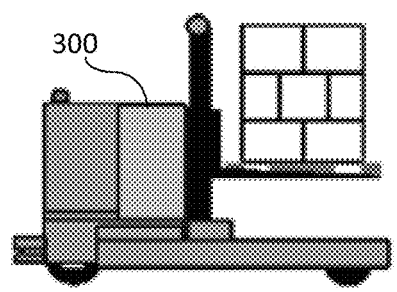
Figure 4:
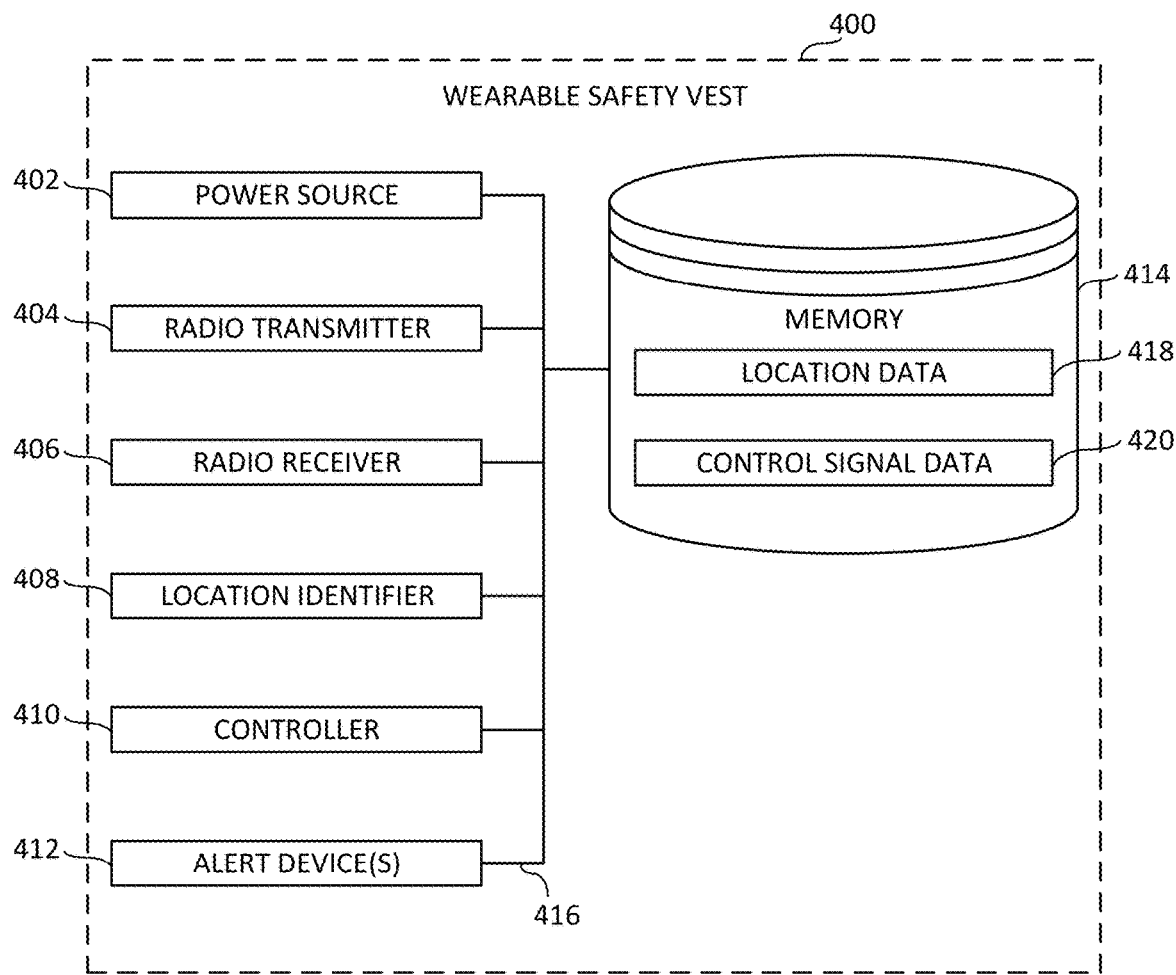
FIG. 4 is a block diagram of an example wearable safety vest constructed in accordance with the teachings of this disclosure.
Figure 4:
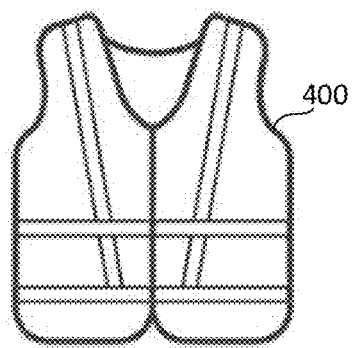

In some examples, the travel data determined by the travel determiner 206 of FIG. 2 may include time-based location data (e.g., a current location and one or more historical and/or prior location(s)) associated with the automated machine(s) (e.g., the automated machine 300 of FIG. 3) and/or the wearable safety vest(s) (e.g., the wearable safety vest 400 of FIG. 4). In other examples, the travel data determined by the travel determiner 206 of FIG. 2 may further include directional data (e.g., one or more direction(s) of travel) associated with the automated machine(s) (e.g., the automated machine 300 of FIG. 3) and/or the wearable safety vest(s) (e.g., the wearable safety vest 400 of FIG. 4). In some such other examples, the travel determiner 206 of FIG. 2 may determine the direction(s) of travel based on the time-based location data. In still other examples, the travel data determined by the travel determiner 206 of FIG. 2 may further include rate data (e.g., one or more rate(s) of travel) associated with the automated machine(s) (e.g., the automated machine 300 of FIG. 3) and/or the wearable safety vest(s) (e.g., the wearable safety vest 400 of FIG. 4). In some such other examples, the travel determiner 206 of FIG. 2 may determine the rate(s) of travel based on the time-based location data. Travel data determined by the travel determiner 206 of FIG. 2 may be of any type, form and/or format, and may be stored in a computer-readable storage medium such as the memory 214 of FIG. 2 described below.

The collision probability determiner 208 of FIG. 2 determines one or more collision probabilities (e.g., the collision probability data 224 of FIG. 2) based on the travel data (e.g., the travel data 220 of FIG. 2) associated with the automated machine(s) and/or the wearable safety vest(s), and further based on the one or more collision probability algorithm(s) 222 stored in the memory 214 of FIG. 2 and accessible to the collision probability determiner 208. For example, the collision probability determiner 208 of FIG. 2 may determine a collision probability based on the travel data associated with the automated machine 300 of FIG. 3 and/or the wearable safety vest 400 of FIG. 4, and further based on the one or more collision probability algorithm(s) 222 of FIG. 2. In some such examples, the collision probability determiner 208 of FIG. 2 may apply the travel data (e.g., the travel data 220 of FIG. 2) determined by the travel determiner 206 of FIG. 2 as input data to one or more of the collision probability algorithm(s) 222 of FIG. 2 to determine the probability of a collision between the automated machine 300 of FIG. 3 and the wearable safety vest 400 of FIG. 4. Collision probability data determined by the collision probability determiner 208 of FIG. 2 may be of any type, form and/or format, and may be stored in a computer-readable storage medium such as the memory 214 of FIG. 2 described below.

The safety manager 210 of FIG. 2 compares the collision probabilities determined by the collision probability determiner 208 of FIG. 2 (e.g., the collision probability data 224 of FIG. 2) to a collision probability threshold (e.g., the collision probability threshold 226 of FIG. 2). For example, the safety manager 210 of FIG. 2 may compare the collision probability between the automated machine 300 of FIG. 3 and the wearable safety vest 400 of FIG. 4 to the collision probability threshold. The collision probability threshold to which the safety manager 210 of FIG. 2 compares the collision probabilities may be of any type, form and/or format, and may be stored in a computer-readable storage medium such as the memory 214 of FIG. 2 described below.

The safety manager 210 of FIG. 2 determines whether any of the compared collision probabilities exceed(s) the collision probability threshold. For example, the safety manager 210 of FIG. 2 may determine that the collision probability between the automated machine 300 of FIG. 3 and the wearable safety vest 400 of FIG. 4 exceeds the collision probability threshold. In response to determining that one or more collision probabilities exceed(s) the collision probability threshold, the safety manager 210 of FIG. 2 controls and/or instructs the control signal generator 212 of FIG. 2 to generate one or more control signal(s) to be transmitted (e.g., via the radio transmitter 202 of FIG. 2) to the automated machine(s) (e.g., the automated machine 300 of FIG. 3) and/or the wearable safety vest(s) (e.g., the wearable safety vest 400 of FIG. 4) associated with the excessive collision probabilities.

In some examples, the safety manager 210 of FIG. 2 controls and/or instructs the control signal generator 212 of FIG. 2 to generate one or more control signal(s) to be transmitted at approximately the same time to the automated machine(s) (e.g., the automated machine 300 of FIG. 3) and/or the wearable safety vest(s) (e.g., the wearable safety vest 400 of FIG. 4) associated with the excessive collision probabilities. In other examples, the safety manager 210 of FIG. 2 may control and/or instruct the control signal generator 212 of FIG. 2 to generate one or more control signal(s) to be transmitted at a first time to the automated machine(s) (e.g., the automated machine 300 of FIG. 3) associated with the excessive collision probabilities, and may separately control and/or instruct the control signal generator 212 of FIG. 2 to generate one or more control signal(s) to be transmitted at a second time (e.g., subsequent to the first time) to the wearable safety vest(s) (e.g., the wearable safety vest 400 of FIG. 4) associated with the excessive collision probabilities. In some such examples, the safety manager 210 may analyze updated collision probabilities (e.g., collision probabilities determined by the collision probability determiner 208 of FIG. 2 based on more recent location data and/or travel data) for the automated machine(s) (e.g., the automated machine 300 of FIG. 3) and the wearable safety vest(s) (e.g., the wearable safety vest 400 of FIG. 4) associated with the excessive collision probabilities in connection with reevaluating and/or re-determining whether the collision probabilities that were previously determined to be excessive remain excessive subsequent to the first time.

The control signal generator 212 of FIG. 2 generates one or more control signal(s) (e.g., the control signal data 228 of FIG. 2) to be transmitted (e.g., via the radio transmitter 202 of FIG. 2) to the automated machine(s) and/or the wearable safety vest(s). For example, the control signal generator 212 of FIG. 2 may generate one or more control signal(s) to be transmitted to the automated machine 300 of FIG. 3 and/or the wearable safety vest 400 of FIG. 4. In some examples, the control signal generator 212 of FIG. 2 generates the one or more control signal(s) in response to one or more instruction(s) and/or communication(s) received from the safety manager 210 of FIG. 2. In some examples, the control signal generator 212 of FIG. 2 may generate one or more control signal(s) to be transmitted to an automated machine (e.g., the automated machine 300 of FIG. 3) to adjust one or more operation(s) of the automated machine. In some examples, the control signal generator 212 of FIG. 2 may generate one or more control signal(s) to be transmitted to a wearable safety vest (e.g., the wearable safety vest 400 of FIG. 4) to present one or more alert(s) at the wearable safety vest. Control signal data generated by the control signal generator 212 of FIG. 2 may be of any type, form and/or format, and may be stored in a computer-readable storage medium such as the memory 214 of FIG. 2 described below.

The memory 214 of FIG. 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 214 of FIG. 2 may be stored in any file and/or data structure format, organization scheme, and/or arrangement.

Data and/or information received by the radio receiver 204 of FIG. 2, and/or, more generally, by the operations management apparatus 200 of FIG. 2 from the automated machine(s) (e.g., the automated machine 300 of FIG. 3) and/or the wearable safety vest(s) (e.g., the wearable safety vest 400 of FIG. 4) may be stored in the memory 214 of FIG. 2. Data and/or information to be transmitted by the radio transmitter 202 of FIG. 2, and/or, more generally, by the operations management apparatus 200 of FIG. 2 to the automated machine(s) (e.g., the automated machine 300 of FIG. 3) and/or the wearable safety vest(s) (e.g., the wearable safety vest 400 of FIG. 4) may also be stored in the memory 214 of FIG. 2. Data and/or information corresponding to any of the above-described location data 218, travel data 220, collision probability algorithm(s) 222, collision probability data 224, collision probability threshold 226, and/or control signal data 228 of FIG. 2 may also be stored in the memory 214 of FIG. 2. Data and/or information stored in the memory 214 of FIG. 2 is accessible to the radio transmitter 202, the travel determiner 206, the collision probability determiner 208, the safety manager 210, and the control signal generator 212 of FIG. 2 and/or, more generally, to the operations management apparatus 200 of FIG. 2.

While an example manner of implementing the operations management apparatus 200 is illustrated in FIG. 2, one or more of the elements, processes and/or devices illustrated in FIG. 2 may be combined, divided, re-arranged, omitted, eliminated and/or implemented in any other way. Further, the example radio transmitter 202, the example radio receiver 204, the example travel determiner 206, the example collision probability determiner 208, the example safety manager 210, the example control signal generator 212, the example memory 214 and/or, more generally, the example operations management apparatus 200 of FIG. 2 may be implemented by hardware, software, firmware and/or any combination of hardware, software and/or firmware. Thus, for example, any of the example radio transmitter 202, the example radio receiver 204, the example travel determiner 206, the example collision probability determiner 208, the example safety manager 210, the example control signal generator 212, the example memory 214 and/or, more generally, the example operations management apparatus 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example radio transmitter 202, the example radio receiver 204, the example travel determiner 206, the example collision probability determiner 208, the example safety manager 210, the example control signal generator 212, the example memory 214 and/or, more generally, the example operations management apparatus 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example operations management apparatus 200 of FIG. 2 may include one or more elements, processes and/or devices in addition to, or instead of, those illustrated in FIG. 2, and/or may include more than one of any or all of the illustrated elements, processes and devices.

FIG. 3 is a block diagram of an example automated machine 300 constructed in accordance with the teachings of this disclosure. The first automated machine 108 and/or the second automated machine 112 of FIG. 1 described above may be implemented via the example automated machine 300 of FIG. 3. The automated machine 300 of FIG. 3 includes an example power source 302, an example radio transmitter 304, an example radio receiver 306, an example location identifier 308, an example controller 310, one or more example operation mechanism(s) 312, and an example memory 314. Respective ones of the power source 302, the radio transmitter 304, the radio receiver 306, the location identifier 308, the controller 310, the operation mechanism(s) 312, and the memory 314 of FIG. 3 are operatively coupled to one another via an example network and/or communication bus 316. The memory 314 of FIG. 3 stores example location data 318 and example control signal data 320 associated with the automated machine 300 of FIG. 3.

The power source 302 of FIG. 3 may be implemented via one or more charged and/or rechargeable batteries. The power source 302 supplies electrical energy to the components of the automated machine 300 of FIG. 3. For example, the power source 302 may supply electrical energy to one or more of the radio transmitter 304, the radio receiver 306, the location identifier 308, the controller 310, the operation mechanism(s) 312, and/or the memory 314 of the automated machine 300 of FIG. 3. In some examples, the power source 302 may include one or more solar panel(s) (e.g., an array of solar panels) that convert(s) solar energy into electrical energy to be stored by the batteries of the power source 302 and/or to be supplied to the components of the automated machine 300 of FIG. 3.

The radio transmitter 304 of FIG. 3 transmits data and/or one or more signal(s) to the operations management apparatus 200 of FIG. 2. In some examples, the data and/or signal(s) transmitted by the radio transmitter 304 of FIG. 3 to the operations management apparatus 200 of FIG. 2 is/are communicated via a network such as a wireless network, a radio network, a cellular network, etc. In some examples, the radio transmitter 304 of FIG. 3 may transmit location data (e.g., the location data 318 of FIG. 3) associated with the automated machine 300 of FIG. 3. In some examples, the location data includes the current location and/or one or more historical and/or prior location(s) of the automated machine 300 of FIG. 3, as detected via the location identifier 308 of FIG. 3 described below. Data corresponding to the signal(s) to be transmitted by the radio transmitter 304 of FIG. 3 may be of any type, form and/or format, and may be stored in a computer-readable storage medium such as the memory 314 of FIG. 3 described below.

The radio receiver 306 of FIG. 3 collects, acquires and/or receives data and/or one or more signal(s) from the operations management apparatus 200 of FIG. 2. In some examples, the data and/or signal(s) received by the radio receiver 306 of FIG. 3 from the operations management apparatus 200 of FIG. 2 is/are communicated via a network such as a wireless network, a radio network, a cellular network, etc. In some examples, the radio receiver 306 of FIG. 3 may receive data and/or signal(s) corresponding to control signal(s) (e.g., the control signal data 320 of FIG. 3) to adjust one or more operation(s) of the automated machine 300 of FIG. 3. Data identified and/or derived from the signal(s) collected and/or received by the radio receiver 306 of FIG. 3 may be of any type, form and/or format, and may be stored in a computer-readable storage medium such as the memory 314 of FIG. 3 described below.

The location identifier 308 of FIG. 3 identifies and/or detects one or more location(s) of the automated machine 300 of FIG. 3. In some examples, the location identifier 308 of FIG. 3 may be implemented via a GPS receiver. When implemented as a GPS receiver, the location identifier 308 of FIG. 3 collects, acquires and/or receives data and/or one or more signal(s) from one or more GPS satellite(s) (not shown). The data and/or signal(s) received by the GPS receiver may include information from which the current location of the automated machine 300 of FIG. 3 may be identified and/or derived, including for example, the current latitude and longitude of the automated machine 300. Location data (e.g., the location data 318 of FIG. 3) identified and/or derived from the signal(s) collected and/or received by the GPS receiver may be associated with one or more time(s) (e.g., time stamped) at which the data and/or signal(s) were collected and/or received by the GPS receiver. Location data identified and/or derived from the signal(s) collected and/or received by the GPS receiver may be of any type, form and/or format, and may be stored in a computer-readable storage medium such as the memory 314 of FIG. 3 described below.

In other examples, the location identifier 308 of FIG. 3 may additionally or alternatively be implemented via an RFID tag. In some such other examples, the RFID tag may include the radio transmitter 304 of FIG. 3 described above. In some such other examples, the operations management apparatus 200 of FIG. 2 may further include an RFID tag reader and/or interrogator that may include the radio receiver 204 of FIG. 2 described above. When implemented as an RFID tag, the location identifier 308 of FIG. 3 transmits data and/or one or more signal(s) that may include information from which the current location of the automated machine 300 of FIG. 3 may be identified and/or derived. Location data (e.g., the location data 318 of FIG. 3) identified and/or derived from the signal(s) transmitted by the RFID tag may be of any type, form and/or format, and may be stored in a computer-readable storage medium such as the memory 314 of FIG. 3 described below.

The controller 310 of FIG. 3 controls and/or manages the operation of the power source 302, the radio transmitter 304, the radio receiver 306, the location identifier 308, the operation mechanism(s) 312, and/or the memory 314 of the automated machine 300 of FIG. 3. In some examples, the controller 310 of FIG. 3 may control the supply of electrical energy to the operation mechanism(s) 312 of FIG. 3 via the power source 302 of FIG. 3. In some examples, the controller 310 of FIG. 3 may control the rate and/or the timing at which the location identifier 308 of FIG. 3 identifies and/or detects location data (e.g., the location data 318 of FIG. 3) associated with the automated machine 300 of FIG. 3. In some examples, the controller 310 of FIG. 3 may control the rate and/or the timing at which the radio transmitter 304 of FIG. 3 transmits location data (e.g., the location data 318 of FIG. 3) associated with the automated machine 300 of FIG. 3. In some examples, the controller 310 of FIG. 3 controls the operation mechanism(s) 312 of FIG. 3 based on one or more control signal(s) (e.g., the control signal data 320 of FIG. 3) received from the operations management apparatus 200 of FIG. 2 via the radio receiver 306 of FIG. 3.

The operation mechanism(s) 312 of FIG. 3 may be implemented via one or more drive wheel(s), drive mechanism(s), braking mechanism(s), navigation mechanism(s), motor(s), transmission(s), actuator(s), picking mechanism(s), placing mechanism(s), loading mechanism(s), unloading mechanism(s), welding mechanism(s), cutting mechanism(s), and/or assembly mechanism(s) coupled to and/or incorporated into the automated machine 300 of FIG. 3. One or more operation(s) of the automated machine 300 of FIG. 3 is/are to be adjusted via the operation mechanism(s) 312 of FIG. 3 to reduce the possibility of a collision between the automated machine 300 of FIG. 3 and a human wearing a wearable safety vest (e.g., the wearable safety vest 400 of FIG. 4). In some examples, the operation mechanism(s) 312 of FIG. 3 may cause the automated machine 300 of FIG. 3 to cease and/or stop moving and/or operating. In some examples, the operation mechanism(s) 312 of FIG. 3 may adjust the location, the direction of movement, and/or the rate of movement of the automated machine 300 of FIG. 3. Data and/or information to be communicated to the operation mechanism(s) 312 of FIG. 3 may be of any type, form and/or format, and may be stored in a computer-readable storage medium such as the memory 314 of FIG. 3 described below.

The memory 314 of FIG. 3 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 314 of FIG. 3 may be stored in any file and/or data structure format, organization scheme, and/or arrangement.

Data and/or information received by the radio receiver 306 of FIG. 3, and/or, more generally, by the automated machine 300 of FIG. 3 from the operations management apparatus 200 of FIG. 2 may be stored in the memory 314 of FIG. 3. Data and/or information corresponding to any of the above-described location data 318 and/or control signal data 320 associated with the automated machine 300 of FIG. 3 may also be stored in the memory 314 of FIG. 3. Data and/or information stored in the memory 314 of FIG. 3 is accessible to the radio transmitter 304, the controller 310, and the operation mechanism(s) 312 of FIG. 3 and/or, more generally, to the automated machine 300 of FIG. 3.

While an example manner of implementing the automated machine 300 is illustrated in FIG. 3, one or more of the elements, processes and/or devices illustrated in FIG. 3 may be combined, divided, re-arranged, omitted, eliminated and/or implemented in any other way. Further, the example power source 302, the example radio transmitter 304, the example radio receiver 306, the example location identifier 308, the example controller 310, the example operation mechanism(s) 312, the example memory 314 and/or, more generally, the example automated machine 300 of FIG. 3 may be implemented by hardware, software, firmware and/or any combination of hardware, software and/or firmware. Thus, for example, any of the example power source 302, the example radio transmitter 304, the example radio receiver 306, the example location identifier 308, the example controller 310, the example operation mechanism(s) 312, the example memory 314 and/or, more generally, the example automated machine 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example power source 302, the example radio transmitter 304, the example radio receiver 306, the example location identifier 308, the example controller 310, the example operation mechanism(s) 312, the example memory 314 and/or, more generally, the example automated machine 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example automated machine 300 of FIG. 3 may include one or more elements, processes and/or devices in addition to, or instead of, those illustrated in FIG. 3, and/or may include more than one of any or all of the illustrated elements, processes and devices.

FIG. 4 is a block diagram of an example wearable safety vest 400 constructed in accordance with the teachings of this disclosure. The first wearable safety vest 118 and/or the second wearable safety vest 124 of FIG. 1 described above may be implemented via the example wearable safety vest 400 of FIG. 4. The wearable safety vest 400 of FIG. 4 includes an example power source 402, an example radio transmitter 404, an example radio receiver 406, an example location identifier 408, an example controller 410, one or more example alert device(s) 412, and an example memory 414. Respective ones of the power source 402, the radio transmitter 404, the radio receiver 406, the location identifier 408, the controller 410, the operation mechanism(s) 412, and the memory 414 of FIG. 4 are operatively coupled to one another via an example network and/or communication bus 416. The memory 414 of FIG. 4 stores example location data 418 and example control signal data 420 associated with the wearable safety vest 400 of FIG. 4.

The power source 402 of FIG. 4 may be implemented via one or more charged and/or rechargeable batteries. The power source 402 supplies electrical energy to the components of the wearable safety vest 400 of FIG. 4. For example, the power source 402 may supply electrical energy to one or more of the radio transmitter 404, the radio receiver 406, the location identifier 408, the controller 410, the alert device(s) 412, and/or the memory 414 of the wearable safety vest 400 of FIG. 4. In some examples, the power source 402 may include one or more solar panel(s) (e.g., an array of solar panels) that convert(s) solar energy into electrical energy to be stored by the batteries of the power source 402 and/or to be supplied to the components of the wearable safety vest 400 of FIG. 4.

The radio transmitter 404 of FIG. 4 transmits data and/or one or more signal(s) to the operations management apparatus 200 of FIG. 2. In some examples, the data and/or signal(s) transmitted by the radio transmitter 404 of FIG. 4 to the operations management apparatus 200 of FIG. 2 is/are communicated via a network such as a wireless network, a radio network, a cellular network, etc. In some examples, the radio transmitter 404 of FIG. 4 may transmit location data (e.g., the location data 418 of FIG. 4) associated with the wearable safety vest 400 of FIG. 4. In some examples, the location data includes the current location and/or one or more historical and/or prior location(s) of the wearable safety vest 400 of FIG. 4, as detected via the location identifier 408 of FIG. 4 described below. Data corresponding to the signal(s) to be transmitted by the radio transmitter 404 of FIG. 4 may be of any type, form and/or format, and may be stored in a computer-readable storage medium such as the memory 414 of FIG. 4 described below.

The radio receiver 406 of FIG. 4 collects, acquires and/or receives data and/or one or more signal(s) from the operations management apparatus 200 of FIG. 2. In some examples, the data and/or signal(s) received by the radio receiver 406 of FIG. 4 from the operations management apparatus 200 of FIG. 2 is/are communicated via a network such as a wireless network, a radio network, a cellular network, etc. In some examples, the radio receiver 406 of FIG. 4 may receive data and/or signal(s) corresponding to control signal(s) (e.g., the control signal data 420 of FIG. 4) to present one or more alert(s) at the wearable safety vest 400 of FIG. 4. Data identified and/or derived from the signal(s) collected and/or received by the radio receiver 406 of FIG. 4 may be of any type, form and/or format, and may be stored in a computer-readable storage medium such as the memory 414 of FIG. 4 described below.

The location identifier 408 of FIG. 4 identifies and/or detects one or more location(s) of the wearable safety vest 400 of FIG. 4. In some examples, the location identifier 408 of FIG. 4 may be implemented via a GPS receiver. When implemented as a GPS receiver, the location identifier 408 of FIG. 4 collects, acquires and/or receives data and/or one or more signal(s) from one or more GPS satellite(s) (not shown). The data and/or signal(s) received by the GPS receiver may include information from which the current location of the wearable safety vest 400 of FIG. 4 may be identified and/or derived, including for example, the current latitude and longitude of the wearable safety vest 400. Location data (e.g., the location data 418 of FIG. 4) identified and/or derived from the signal(s) collected and/or received by the GPS receiver may be associated with one or more time(s) (e.g., time stamped) at which the data and/or signal(s) were collected and/or received by the GPS receiver. Location data identified and/or derived from the signal(s) collected and/or received by the GPS receiver may be of any type, form and/or format, and may be stored in a computer-readable storage medium such as the memory 414 of FIG. 4 described below.

In other examples, the location identifier 408 of FIG. 4 may additionally or alternatively be implemented via an RFID tag. In some such other examples, the RFID tag may include the radio transmitter 404 of FIG. 4 described above. In some such other examples, the operations management apparatus 200 of FIG. 2 may further include an RFID tag reader and/or interrogator that may include the radio receiver 204 of FIG. 2 described above. When implemented as an RFID tag, the location identifier 408 of FIG. 4 transmits data and/or one or more signal(s) that may include information from which the current location of the wearable safety vest 400 of FIG. 4 may be identified and/or derived. Location data (e.g., the location data 418 of FIG. 4) identified and/or derived from the signal(s) transmitted by the RFID tag may be of any type, form and/or format, and may be stored in a computer-readable storage medium such as the memory 414 of FIG. 4 described below.

The controller 410 of FIG. 4 controls and/or manages the operation of the power source 402, the radio transmitter 404, the radio receiver 406, the location identifier 408, the alert device(s) 412, and/or the memory 414 of the wearable safety vest 400 of FIG. 4. In some examples, the controller 410 of FIG. 4 may control the supply of electrical energy to the alert device(s) 412 of FIG. 4 via the power source 402 of FIG. 4. In some examples, the controller 410 of FIG. 4 may control the rate and/or the timing at which the location identifier 408 of FIG. 4 identifies and/or detects location data (e.g., the location data 418 of FIG. 4) associated with the wearable safety vest 400 of FIG. 4. In some examples, the controller 410 of FIG. 4 may control the rate and/or the timing at which the radio transmitter 404 of FIG. 4 transmits location data (e.g., the location data 418 of FIG. 4) associated with the wearable safety vest 400 of FIG. 4. In some examples, the controller 410 of FIG. 4 controls the alert device(s) 412 of FIG. 4 based on one or more control signal(s) (e.g., the control signal data 420 of FIG. 4) received from the operations management apparatus 200 of FIG. 2 via the radio receiver 406 of FIG. 4.

The alert device(s) 412 of FIG. 4 may be implemented via one or more information presentation device(s) coupled to and/or incorporated into the wearable safety vest 400 of FIG. 4. One or more alert(s) presented via the alert device(s) 412 of FIG. 4 alert and/or notify a human wearing the wearable safety vest 400 of FIG. 4 of the possibility of a collision between the human and an automated machine (e.g., the automated machine 300 of FIG. 3). In some examples, the alert device(s) 412 of FIG. 4 include one or more light emitting diode(s) and/or display screen(s) to present one or more visual alert(s) at the wearable safety vest 400 of FIG. 4. In some examples, the alert device(s) 412 of FIG. 4 include one or more speaker(s) to present one or more audible alert(s) at the wearable safety vest 400 of FIG. 4. In some examples, the alert device(s) 412 of FIG. 4 include one or more haptic component(s) to present one or more tactile alert(s) at the wearable safety vest 400 of FIG. 4. Data and/or information to be presented via the alert device(s) 412 of FIG. 4 may be of any type, form and/or format, and may be stored in a computer-readable storage medium such as the memory 414 of FIG. 4 described below.

The memory 414 of FIG. 4 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 414 of FIG. 4 may be stored in any file and/or data structure format, organization scheme, and/or arrangement.

Data and/or information received by the radio receiver 406 of FIG. 4, and/or, more generally, by the wearable safety vest 400 of FIG. 4 from the operations management apparatus 200 of FIG. 2 may be stored in the memory 414 of FIG. 4. Data and/or information corresponding to any of the above-described location data 418 and/or control signal data 420 associated with the wearable safety vest 400 of FIG. 4 may also be stored in the memory 414 of FIG. 4. Data and/or information stored in the memory 414 of FIG. 4 is accessible to the radio transmitter 404, the controller 410, and the alert device(s) 412 of FIG. 4 and/or, more generally, to the wearable safety vest 400 of FIG. 4.

While an example manner of implementing the wearable safety vest 400 is illustrated in FIG. 4, one or more of the elements, processes and/or devices illustrated in FIG. 4 may be combined, divided, re-arranged, omitted, eliminated and/or implemented in any other way. Further, the example power source 402, the example radio transmitter 404, the example radio receiver 406, the example location identifier 408, the example controller 410, the example alert device(s) 412, the example memory 414 and/or, more generally, the example wearable safety vest 400 of FIG. 4 may be implemented by hardware, software, firmware and/or any combination of hardware, software and/or firmware. Thus, for example, any of the example power source 402, the example radio transmitter 404, the example radio receiver 406, the example location identifier 408, the example controller 410, the example alert device(s) 412, the example memory 414 and/or, more generally, the example wearable safety vest 400 of FIG. 4 could be implemented by one or more analog or digital circuit(s), logic circuits, programmable processor(s), application specific integrated circuit(s)

(ASIC(s)), programmable logic device(s) (PLD(s)) and/or field programmable logic device(s) (FPLD(s)). When reading any of the apparatus or system claims of this patent to cover a purely software and/or firmware implementation, at least one of the example power source 402, the example radio transmitter 404, the example radio receiver 406, the example location identifier 408, the example controller 410, the example alert device(s) 412, the example memory 414 and/or, more generally, the example wearable safety vest 400 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example wearable safety vest 400 of FIG. 4 may include one or more elements, processes and/or devices in addition to, or instead of, those illustrated in FIG. 3, and/or may include more than one of any or all of the illustrated elements, processes and devices.

Figure 5:
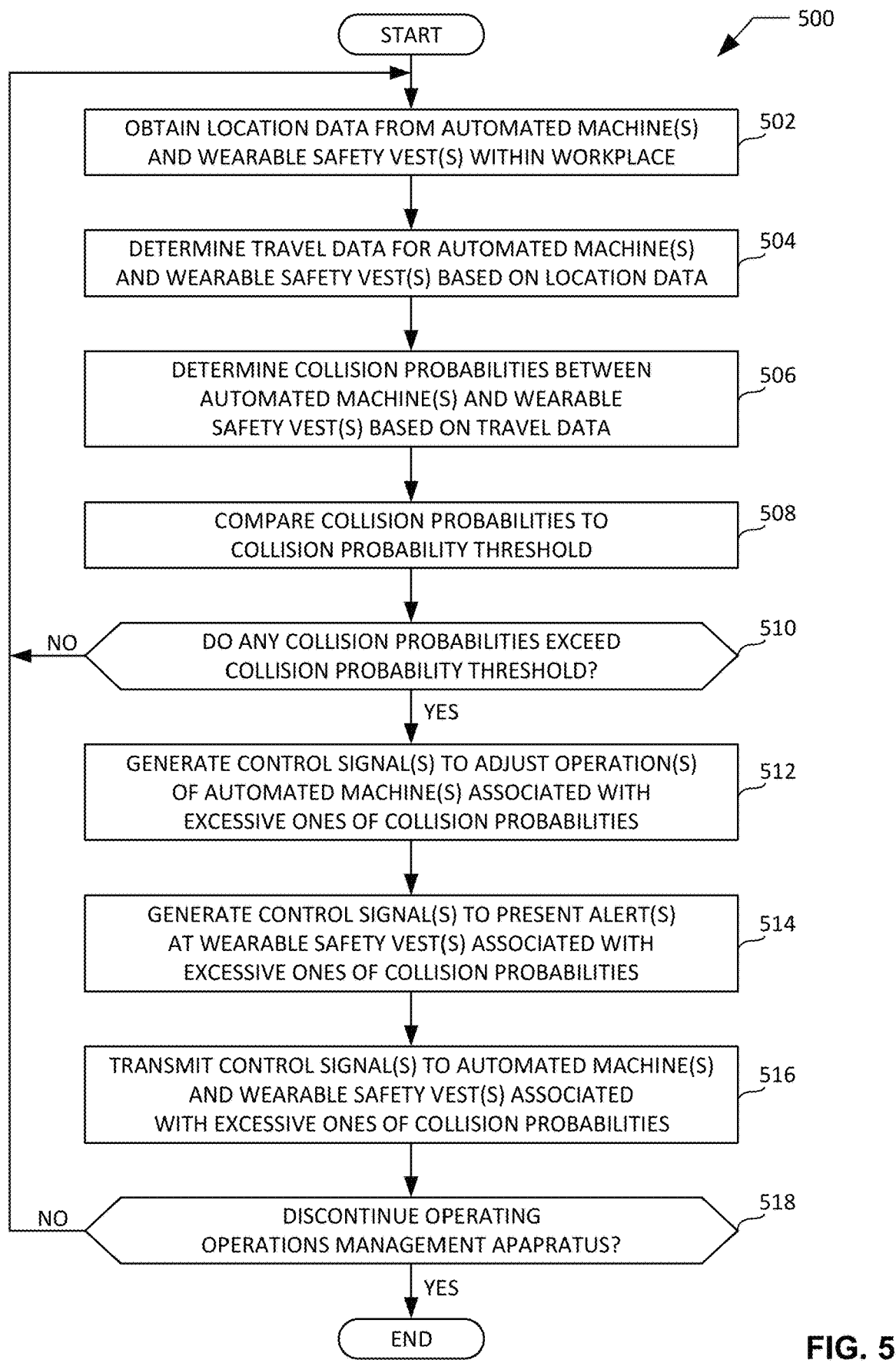
FIG. 5 is a flowchart representative of an example method that may be executed at the example operations management apparatus of FIG. 2 to reduce probabilities of collisions between humans and automated machines operating within a workplace.
Figure 6A:
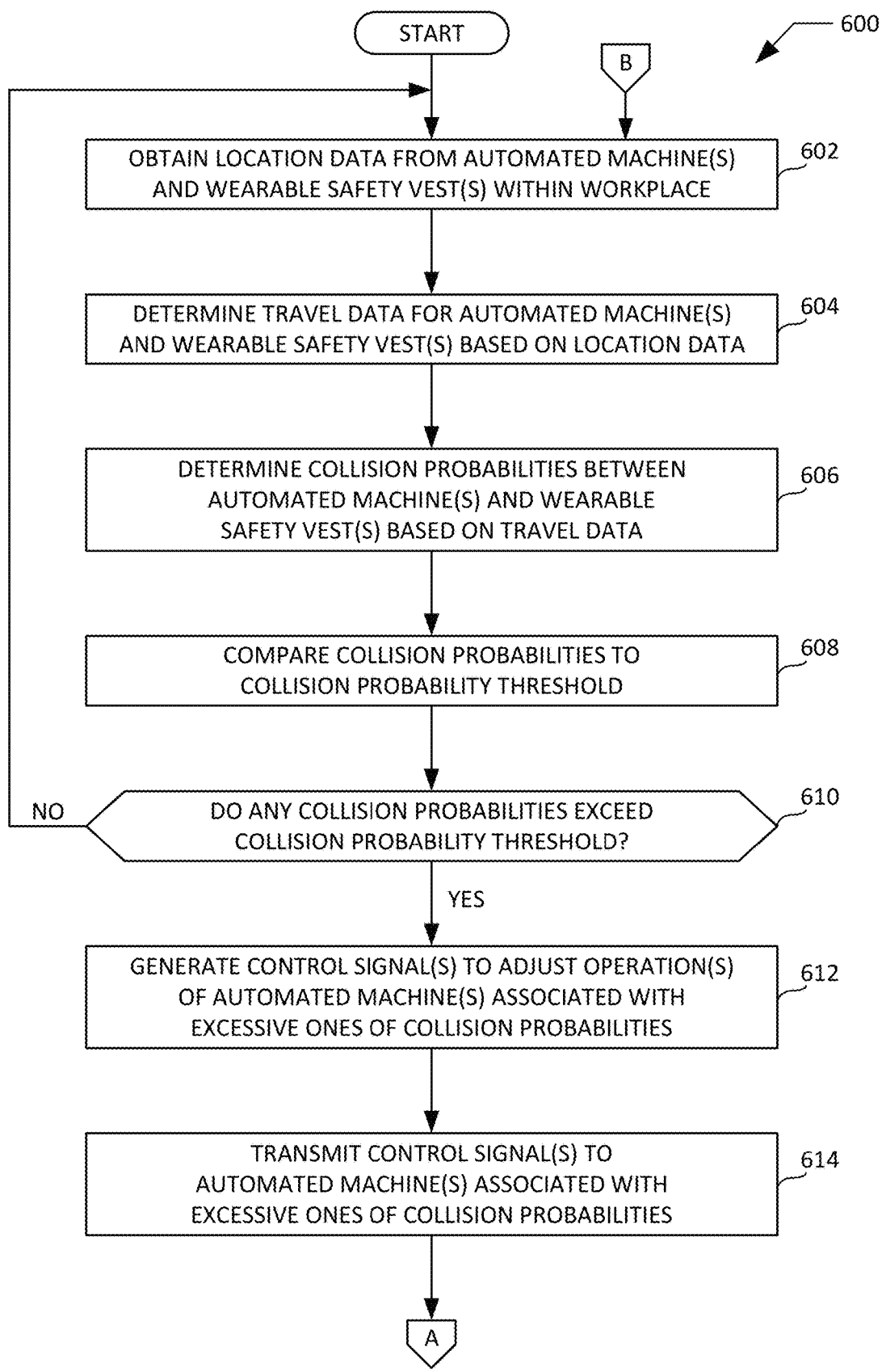
FIGS. 6A and 6B are a flowchart representative of another example method that may be executed at the example operations management apparatus of FIG. 2 to reduce probabilities of collisions between humans and automated machines operating within a workplace.
Figure 6B:
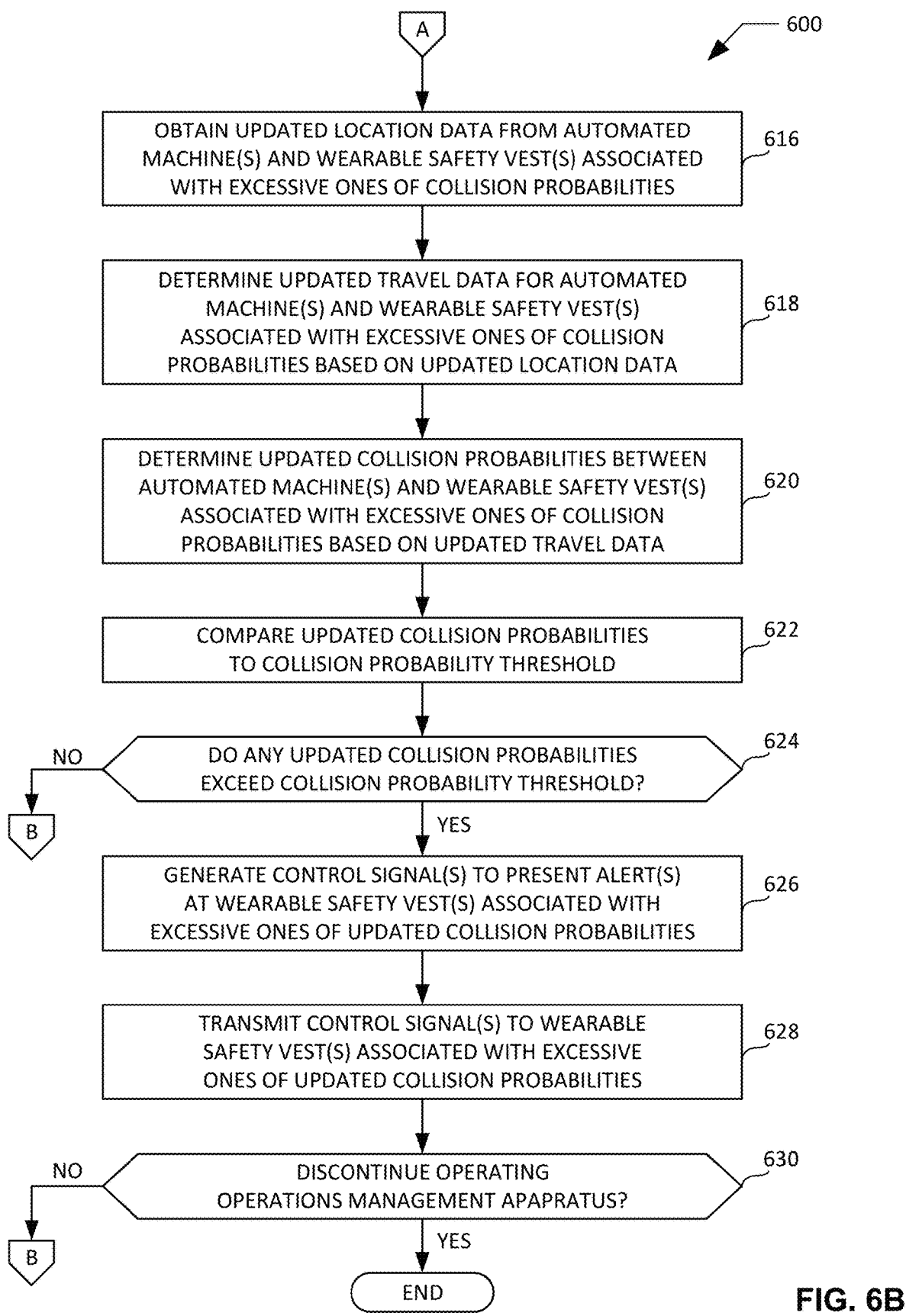
Figure 7:
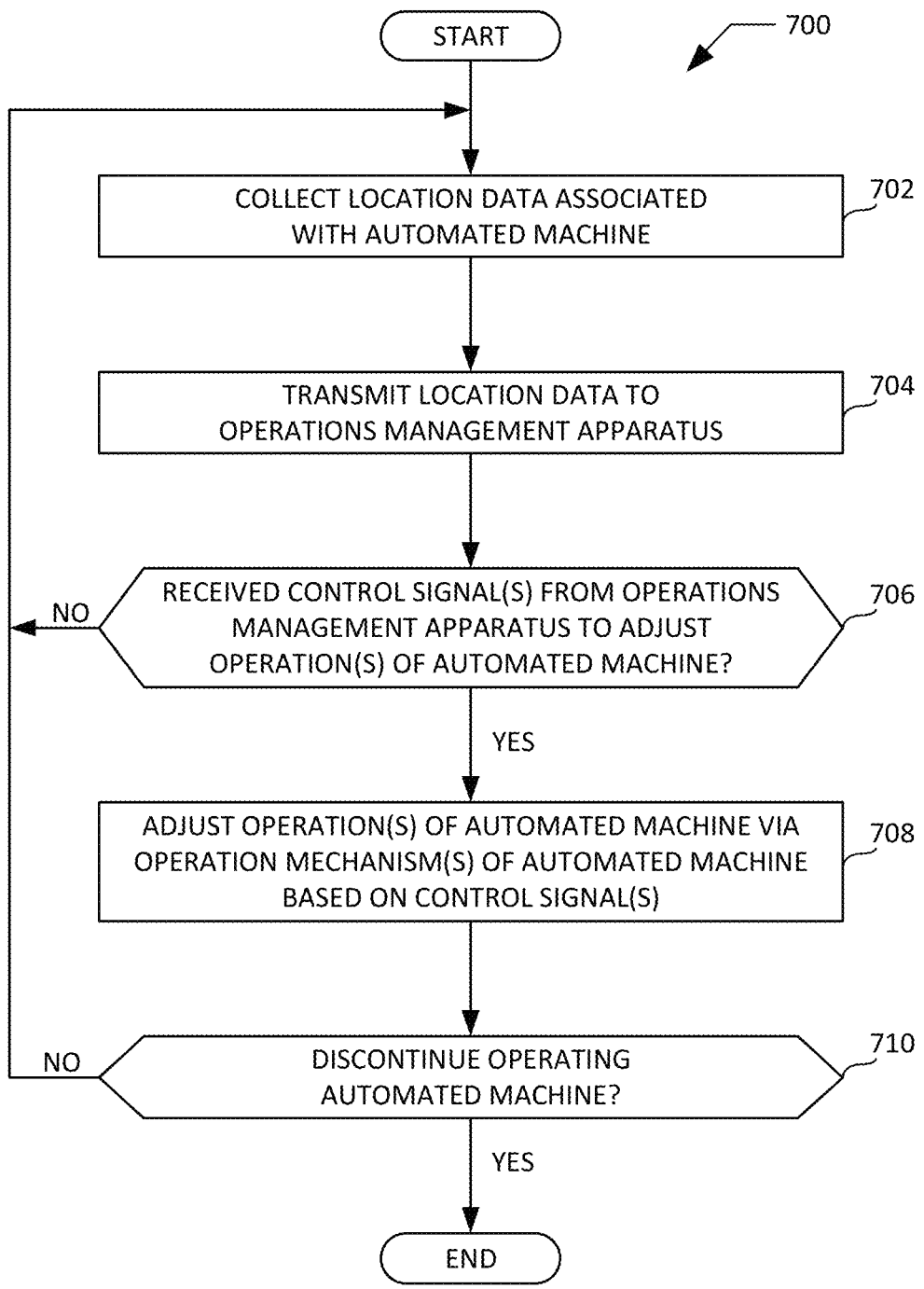
FIG. 7 is a flowchart representative of an example method that may be executed at the example automated machine of FIG. 3 to reduce probabilities of collisions between humans and automated machines operating within a workplace.
Figure 8:
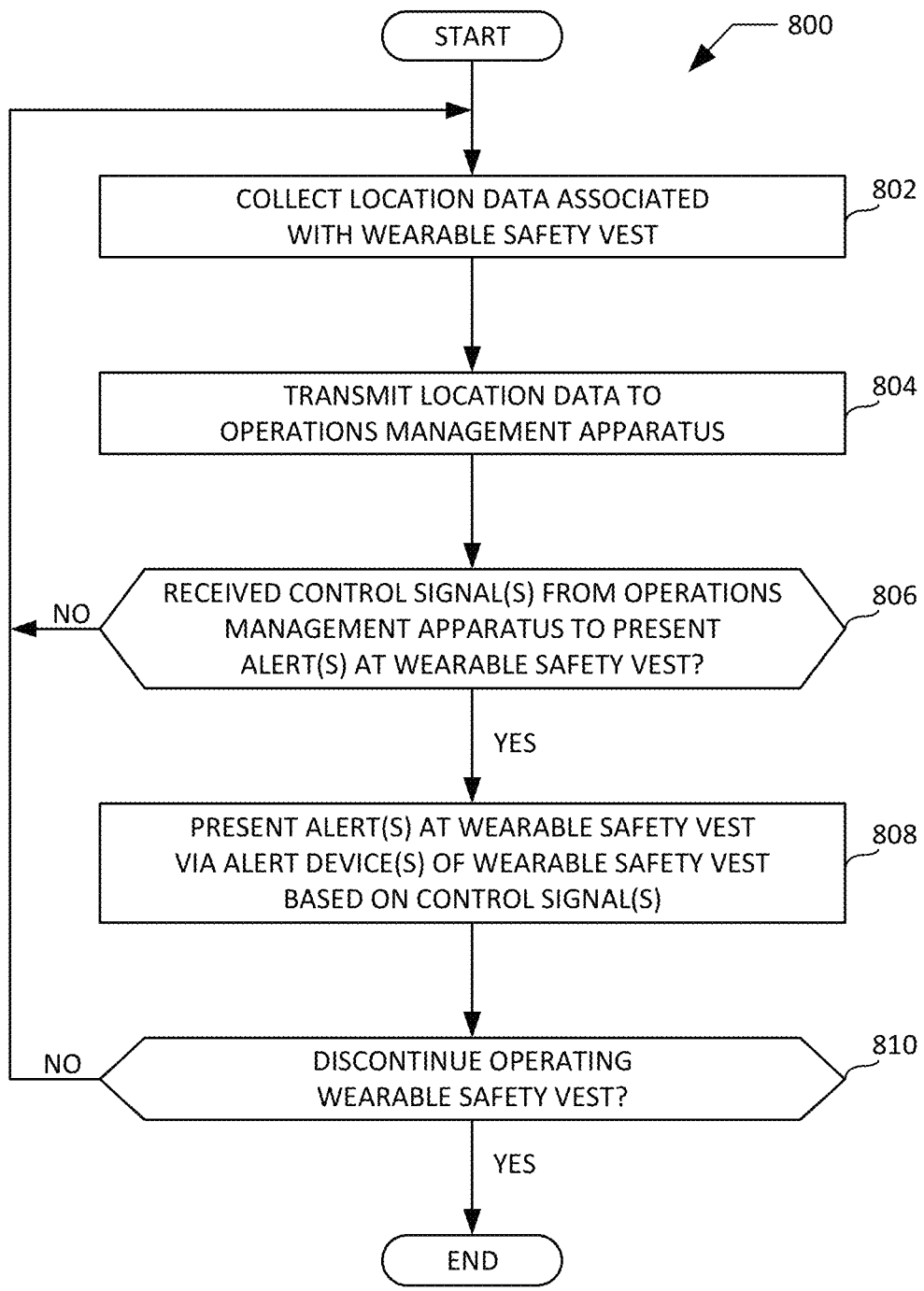
FIG. 8 is a flowchart representative of an example method that may be executed at the example wearable safety vest of FIG. 4 to reduce probabilities of collisions between humans and automated machines operating within a workplace.

An example flowchart representative of an example method for implementing the example operations management apparatus 200 of FIG. 2 to reduce probabilities of collisions between humans and automated machines operating within a workplace is shown in FIG. 5. An example flowchart representative of another example method for implementing the example operations management apparatus 200 of FIG. 2 to reduce probabilities of collisions between humans and automated machines operating within a workplace is shown in FIGS. 6A and 6B. An example flowchart representative of an example method for implementing the example automated machine 300 of FIG. 3 to reduce probabilities of collisions between humans and automated machines operating within a workplace is shown in FIG. 7. An example flowchart representative of an example method for implementing the example wearable safety vest 400 of FIG. 4 to reduce probabilities of collisions between humans and automated machines operating within a workplace is shown in FIG. 8. In these examples, the methods may be implemented using machine readable instructions that comprise one or more program(s) for execution by one or more processor(s) such as the processor 902 shown in the example processor platform 900 discussed below in connection with FIG. 9, the processor 1002 shown in the example processor platform 1000 discussed below in connection with FIG. 10, and/or the processor 1102 shown in the example processor platform 1100 discussed below in connection with FIG. 11. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 902, the processor 1002 and/or the processor 1102, but the entirety of any program and/or parts thereof could alternatively be executed by a device other than the processor 902, the processor 1002 and/or the processor 1102, and/or embodied in firmware or dedicated hardware. Further, although the example program(s) is/are described with reference to the flowcharts illustrated in FIGS. 5, 6A, 6B, 7 and 8, many other methods of implementing the example operations management apparatus 200 of FIG. 2, the example automated machine 300 of FIG. 3, and/or the example wearable safety vest 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example methods of FIGS. 5, 6A, 6B, 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 5 is a flowchart representative of an example method 500 that may be executed at the example operations management apparatus 200 of FIG. 2 to reduce probabilities of collisions between humans and automated machines operating within a workplace. The example method 500 of FIG. 5 begins when the radio receiver 204 of the operations management apparatus 200 of FIG. 2 obtains, collects, and/or receives location data from one or more automated machine(s) and one or more wearable safety vest(s) located and/or traveling within a workplace (block 502). For example, the radio receiver 204 of FIG. 2 may obtain, collect and/or receive location data (e.g., the location data 218 of FIG. 2) including first location data (e.g., the location data 318 of FIG. 3) associated with the automated machine 300 of FIG. 3 and second location data (e.g., the location data 418 of FIG. 4) associated with the wearable safety vest 400 of FIG. 4. Following block 502, control of the example method 500 of FIG. 5 proceeds to block 504.

At block 504, the travel determiner 206 of the operations management apparatus 200 of FIG. 2 determines travel data for respective ones of the automated machine(s) and the wearable safety vest(s) based on the location data (block 504). For example, the travel determiner 206 of FIG. 2 may determine travel data (e.g., the travel data 220 of FIG. 2) associated with the first location data (e.g., the location data 318 of FIG. 3) received from the automated machine 300 of FIG. 3 and associated with the second location data (e.g., the location data 418 of FIG. 4) received from the wearable safety vest 400 of FIG. 4. Following block 504, control of the example method 500 of FIG. 5 proceeds to block 506.

At block 506, the collision probability determiner 208 of the operations management apparatus 200 of FIG. 2 determines collision probabilities between respective ones of the automated machine(s) and the wearable safety vest(s) based on the travel data (block 506). For example, the collision probability determiner 208 of FIG. 2 may determine a collision probability (e.g., the collision probability data 224 of FIG. 2) between the automated machine 300 of FIG. 3 and the wearable safety vest 400 of FIG. 4 by applying the travel data (e.g., the travel data 220 of FIG. 2) to one or more collision probability algorithm(s) (e.g., the collision probability algorithm(s) 222 of FIG. 2). Following block 506, control of the example method 500 of FIG. 5 proceeds to block 508.

At block 508, the safety manager 210 of the operations management apparatus 200 of FIG. 2 compares respective ones of the collision probabilities to a collision probability threshold (block 508). For example, the safety manager 210 of FIG. 2 may compare the collision probability (e.g., the collision probability data 224 of FIG. 2) between the automated machine 300 of FIG. 3 and the wearable safety vest 400 of FIG. 4 to a collision probability threshold (e.g., the collision probability threshold 226 of FIG. 2). Following block 508, control of the example method 500 of FIG. 5 proceeds to block 510.

At block 510, the safety manager 210 of the operations management apparatus 200 of FIG. 2 determines whether any of the collision probabilities exceed the collision probability threshold (block 510). For example, the safety manager 210 of FIG. 2 may determine that the collision probability (e.g., the collision probability data 224 of FIG. 2) between the automated machine 300 of FIG. 3 and the wearable safety vest 400 of FIG. 4 exceeds the collision probability threshold (e.g., the collision probability threshold 226 of FIG. 2). If the safety manager 210 of FIG. 2 determines at block 510 that none of the collision probabilities exceed the collision probability threshold, control of the example method 500 of FIG. 5 returns to block 502. If the safety manager 210 of FIG. 2 instead determines at block 510 that one or more of the collision probabilities exceed(s) the collision probability threshold, control of the example method 500 of FIG. 5 proceeds to block 512.

At block 512, the control signal generator 212 of the operations management apparatus 200 of FIG. 2 generates one or more control signal(s) to adjust one or more operation(s) of respective ones of the automated machine(s) associated with the excessive ones of the collision probabilities (block 512). For example, in response to the safety manager 210 of FIG. 2 determining at block 510 that the collision probability between the automated machine 300 of FIG. 3 and the wearable safety vest 400 of FIG. 4 exceeds the collision probability threshold, the control signal generator 212 of FIG. 2 may generate one or more control signal(s) to adjust one or more operation(s) of the automated machine 300 of FIG. 3. Following block 512, control of the example method 500 of FIG. 5 proceeds to block 514.

At block 514, the control signal generator 212 of the operations management apparatus 200 of FIG. 2 generates one or more control signal(s) to present one or more alert(s) at respective ones of the wearable safety vest(s) associated with the excessive ones of the collision probabilities (block 514). For example, in response to the safety manager 210 of FIG. 2 determining at block 510 that the collision probability between the automated machine 300 of FIG. 3 and the wearable safety vest 400 of FIG. 4 exceeds the collision probability threshold, the control signal generator 212 of FIG. 2 may generate one or more control signal(s) to present one or more alert(s) at the wearable safety vest 400 of FIG. 4. Following block 514, control of the example method 500 of FIG. 5 proceeds to block 516.

At block 516, the radio transmitter 202 of the operations management apparatus 200 of FIG. 2 transmits respective ones of the one or more control signal(s) to corresponding respective ones of the automated machine(s) and corresponding respective ones of the wearable safety vest(s) associated with the excessive ones of the collision probabilities (block 516). For example, the radio transmitter 202 of FIG. 2 may transmit one or more of the control signal(s) generated at block 512 by the control signal generator 212 of FIG. 2 to the automated machine 300 of FIG. 3, and may further transmit one or more of the control signal(s) generated at block 514 by the control signal generator 212 of FIG. 2 to the wearable safety vest 400 of FIG. 4. Following block 516, control of the example method 500 of FIG. 5 proceeds to block 518.

At block 518, the operations management apparatus 200 of FIG. 2 determines whether to discontinue operating the operations management apparatus 200 of FIG. 2 (block 518). For example, the operations management apparatus 200 may receive one or more control signal(s) indicating that operation of the operations management apparatus 200 of FIG. 2 is to cease. If the operations management apparatus 200 of FIG. 2 determines at block 518 that operation of the operations management apparatus 200 of FIG. 2 is not to be discontinued, control of the example method 500 of FIG. 5 returns to block 502. If the operations management apparatus 200 of FIG. 2 instead determines at block 518 that operation of the operations management apparatus 200 of FIG. 2 is to be discontinued, the example method 500 of FIG. 5 ends.

FIGS. 6A and 6B are a flowchart representative of another example method 600 that may be executed at the example operations management apparatus 200 of FIG. 2 to reduce probabilities of collisions between humans and automated machines operating within a workplace. The example method 600 of FIGS. 6A and 6B begins when the radio receiver 204 of the operations management apparatus 200 of FIG. 2 obtains, collects, and/or receives location data from one or more automated machine(s) and one or more wearable safety vest(s) located and/or traveling within a workplace (block 602). For example, the radio receiver 204 of FIG. 2 may obtain, collect and/or receive location data (e.g., the location data 218 of FIG. 2) including first location data (e.g., the location data 318 of FIG. 3) associated with the automated machine 300 of FIG. 3 and second location data (e.g., the location data 418 of FIG. 4) associated with the wearable safety vest 400 of FIG. 4. Following block 602, control of the example method 600 of FIGS. 6A and 6B proceeds to block 604.

At block 604, the travel determiner 206 of the operations management apparatus 200 of FIG. 2 determines travel data for respective ones of the automated machine(s) and the wearable safety vest(s) based on the location data (block 604). For example, the travel determiner 206 of FIG. 2 may determine travel data (e.g., the travel data 220 of FIG. 2) associated with the first location data (e.g., the location data 318 of FIG. 3) received from the automated machine 300 of FIG. 3 and associated with the second location data (e.g., the location data 418 of FIG. 4) received from the wearable safety vest 400 of FIG. 4. Following block 604, control of the example method 600 of FIGS. 6A and 6B proceeds to block 606.

At block 606, the collision probability determiner 208 of the operations management apparatus 200 of FIG. 2 determines collision probabilities between respective ones of the automated machine(s) and the wearable safety vest(s) based on the travel data (block 606). For example, the collision probability determiner 208 of FIG. 2 may determine a collision probability (e.g., the collision probability data 224 of FIG. 2) between the automated machine 300 of FIG. 3 and the wearable safety vest 400 of FIG. 4 by applying the travel data (e.g., the travel data 220 of FIG. 2) to one or more collision probability algorithm(s) (e.g., the collision probability algorithm(s) 222 of FIG. 2). Following block 606, control of the example method 600 of FIGS. 6A and 6B proceeds to block 608.

At block 608, the safety manager 210 of the operations management apparatus 200 of FIG. 2 compares respective ones of the collision probabilities to a collision probability threshold (block 608). For example, the safety manager 210 of FIG. 2 may compare the collision probability (e.g., the collision probability data 224 of FIG. 2) between the automated machine 300 of FIG. 3 and the wearable safety vest 400 of FIG. 4 to a collision probability threshold (e.g., the collision probability threshold 226 of FIG. 2). Following block 608, control of the example method 600 of FIGS. 6A and 6B proceeds to block 610.

At block 610, the safety manager 210 of the operations management apparatus 200 of FIG. 2 determines whether any of the collision probabilities exceed the collision probability threshold (block 610). For example, the safety manager 210 of FIG. 2 may determine that the collision probability (e.g., the collision probability data 224 of FIG. 2) between the automated machine 300 of FIG. 3 and the wearable safety vest 400 of FIG. 4 exceeds the collision probability (e.g., the collision probability threshold 226 of FIG. 2). If the safety manager 210 of FIG. 2 determines at block 610 that none of the collision probabilities exceed the collision probability threshold, control of the example method 600 of FIGS. 6A and 6B returns to block 602. If the safety manager 210 of FIG. 2 instead determines at block 610 that one or more of the collision probabilities exceed(s) the collision probability threshold, control of the example method 600 of FIGS. 6A and 6B proceeds to block 612.

At block 612, the control signal generator 212 of the operations management apparatus 200 of FIG. 2 generates one or more control signal(s) to adjust one or more operation(s) of respective ones of the automated machine(s) associated with the excessive ones of the collision probabilities (block 612). For example, in response to the safety manager 210 of FIG. 2 determining at block 610 that the collision probability between the automated machine 300 of FIG. 3 and the wearable safety vest 400 of FIG. 4 exceeds the collision probability threshold, the control signal generator 212 of FIG. 2 may generate one or more control signal(s) to adjust one or more operation(s) of the automated machine 300 of FIG. 3. Following block 612, control of the example method 600 of FIGS. 6A and 6B proceeds to block 614.

At block 614, the radio transmitter 202 of the operations management apparatus 200 of FIG. 2 transmits respective ones of the one or more control signal(s) to corresponding respective ones of the automated machine(s) associated with the excessive ones of the collision probabilities (block 614). For example, the radio transmitter 202 of FIG. 2 may transmit one or more of the control signal(s) generated at block 612 by the control signal generator 212 of FIG. 2 to the automated machine 300 of FIG. 3. Following block 614, control of the example method 600 of FIGS. 6A and 6B proceeds to block 616.

At block 616, the radio receiver 204 of the operations management apparatus 200 of FIG. 2 obtains, collects, and/or receives updated location data from the automated machine(s) and the wearable safety vest(s) associated with the excessive ones of the collision probabilities (block 616). For example, in response to the safety manager 210 of FIG. 2 determining at block 610 that the collision probability between the automated machine 300 of FIG. 3 and the wearable safety vest 400 of FIG. 4 exceeds the collision probability threshold, the radio receiver 204 of FIG. 2 may obtain, collect and/or receive updated location data (e.g., location data that is more recent relative to the location data obtained at block 602) including updated first location data associated with the automated machine 300 of FIG. 3 and updated second location data associated with the wearable safety vest 400 of FIG. 4. Following block 616, control of the example method 600 of FIGS. 6A and 6B proceeds to block 618.

At block 618, the travel determiner 206 of the operations management apparatus 200 of FIG. 2 determines updated travel data for respective ones of the automated machine(s) and the wearable safety vest(s) associated with the excessive ones of the collision probabilities based on the updated location data (block 618). For example, the travel determiner 206 of FIG. 2 may determine updated travel data (e.g., travel data that is more recent relative to the travel data determined at block 604) associated with the updated first location data received from the automated machine 300 of FIG. 3 and associated with the updated second location data received from the wearable safety vest 400 of FIG. 4. Following block 618, control of the example method 600 of FIGS. 6A and 6B proceeds to block 620.

At block 620, the collision probability determiner 208 of the operations management apparatus 200 of FIG. 2 determines updated collision probabilities between respective ones of the automated machine(s) and the wearable safety vest(s) associated with the excessive ones of the collision probabilities based on the updated travel data (block 620). For example, the collision probability determiner 208 of FIG. 2 may determine an updated collision probability between the automated machine 300 of FIG. 3 and the wearable safety vest 400 of FIG. 4 by applying the updated travel data to one or more collision probability algorithm(s). Following block 620, control of the example method 600 of FIGS. 6A and 6B proceeds to block 622.

At block 622, the safety manager 210 of the operations management apparatus 200 of FIG. 2 compares respective ones of the updated collision probabilities to the collision probability threshold (block 622). For example, the safety manager 210 of FIG. 2 may compare the updated collision probability between the automated machine 300 of FIG. 3 and the wearable safety vest 400 of FIG. 4 to the collision probability threshold (e.g., the collision probability threshold 226 of FIG. 2). Following block 622, control of the example method 600 of FIGS. 6A and 6B proceeds to block 624.

At block 624, the safety manager 210 of the operations management apparatus 200 of FIG. 2 determines whether any of the updated collision probabilities exceed the collision probability threshold (block 624). For example, the safety manager 210 of FIG. 2 may determine that the updated collision probability between the automated machine 300 of FIG. 3 and the wearable safety vest 400 of FIG. 4 exceeds the collision probability threshold (e.g., the collision probability threshold 226 of FIG. 2). If the safety manager 210 of FIG. 2 determines at block 624 that none of the updated collision probabilities exceed the collision probability threshold, control of the example method 600 of FIGS. 6A and 6B returns to block 602. If the safety manager 210 of FIG. 2 instead determines at block 624 that one or more of the updated collision probabilities exceed(s) the collision probability threshold, control of the example method 600 of FIGS. 6A and 6B proceeds to block 626.

At block 626, the control signal generator 212 of the operations management apparatus 200 of FIG. 2 generates one or more control signal(s) to present one or more alert(s) at respective ones of the wearable safety vest(s) associated with the excessive ones of the updated collision probabilities (block 626). For example, in response to the safety manager 210 of FIG. 2 determining at block 624 that the updated collision probability between the automated machine 300 of FIG. 3 and the wearable safety vest 400 of FIG. 4 exceeds the collision probability threshold, the control signal generator 212 of FIG. 2 may generate one or more control signal(s) to present one or more alert(s) at the wearable safety vest 400 of FIG. 4. Following block 626, control of the example method 600 of FIGS. 6a and 6B proceeds to block 628.

At block 628, the radio transmitter 202 of the operations management apparatus 200 of FIG. 2 transmits respective ones of the one or more control signal(s) to corresponding respective ones of the wearable safety vest(s) associated with the excessive ones of the updated collision probabilities (block 628). For example, the radio transmitter 202 of FIG. 2 may transmit one or more of the control signal(s) generated at block 626 by the control signal generator 212 of FIG. 2 to the wearable safety vest 400 of FIG. 4. Following block 628, control of the example method 600 of FIGS. 6A and 6B proceeds to block 630.

At block 630, the operations management apparatus 200 of FIG. 2 determines whether to discontinue operating the operations management apparatus 200 of FIG. 2 (block 630). For example, the operations management apparatus 200 may receive one or more control signal(s) indicating that operation of the operations management apparatus 200 of FIG. 2 is to cease. If the operations management apparatus 200 of FIG. 2 determines at block 630 that operation of the operations management apparatus 200 of FIG. 2 is not to be discontinued, control of the example method 600 of FIGS. 6A and 6B returns to block 602. If the operations management apparatus 200 of FIG. 2 instead determines at block 630 that operation of the operations management apparatus 200 of FIG. 2 is to be discontinued, the example method 600 of FIGS. 6A and 6B ends.

FIG. 7 is a flowchart representative of an example method 700 that may be executed at the example automated machine 300 of FIG. 3 to reduce probabilities of collisions between humans and automated machines operating within a workplace. The example method 700 of FIG. 7 begins when the location identifier 308 of the automated machine 300 of FIG. 3 collects acquires, and/or obtains location data (e.g., the location data 318 of FIG. 3) associated with the automated machine 300 of FIG. 3 (block 702). Following block 702, control of the example method 700 of FIG. 7 proceeds to block 704.

At block 704, the radio transmitter 304 of the automated machine 300 of FIG. 3 transmits the location data to the operations management apparatus 200 of FIG. 2 (block 704). Following block 704, control of the example method 700 of FIG. 7 proceeds to block 706.

At block 706, the controller 310 of the automated machine 300 of FIG. 3 determines whether any control signal(s) have been received from the operations management apparatus 200 of FIG. 2 (e.g., via the radio receiver 306 of the automated machine 300 of FIG. 3) to adjust one or more operation(s) of the automated machine 300 of FIG. 3 (block 706). If the controller 310 of FIG. 3 determines at block 706 that no control signal(s) have been received from the operations management apparatus 200 of FIG. 2 to adjust one or more operation(s) of the automated machine 300 of FIG. 3, control of the example method 700 of FIG. 7 returns to block 702. If the controller 310 of FIG. 3 instead determines at block 706 that one or more control signal(s) have been received from the operations management apparatus 200 of FIG. 2 to adjust one or more operation(s) of the automated machine 300 of FIG. 3, control of the example method 700 of FIG. 7 proceeds to block 708.

At block 708, the controller 310 of the automated machine 300 of FIG. 3 adjusts one or more operation(s) of the automated machine 300 of FIG. 3 via one or more of the operation mechanism(s) 312 of the automated machine 300 of FIG. 3 based on the one or more control signal(s) (e.g., the control signal data 320 of FIG. 3) received from the operations management apparatus 200 of FIG. 2 (block 708). Following block 708, control of the example method 700 of FIG. 7 proceeds to block 710.

At block 710, the controller 310 of the automated machine 300 of FIG. 3 determines whether to discontinue operating the automated machine 300 of FIG. 3 (block 710). For example, the controller 310 may receive one or more control signal(s) indicating that operation of the automated machine 300 of FIG. 3 is to cease. If the controller 310 of FIG. 3 determines at block 710 that operation of the automated machine 300 of FIG. 3 is not to be discontinued, control of the example method 700 of FIG. 7 returns to block 702. If the controller 310 of FIG. 3 instead determines at block 710 that operation of the automated machine 300 of FIG. 3 is to be discontinued, the example method 700 of FIG. 7 ends.

FIG. 8 is a flowchart representative of an example method 800 that may be executed at the example wearable safety vest 400 of FIG. 4 to reduce probabilities of collisions between humans and automated machines operating within a workplace. The example method 800 of FIG. 8 begins when the location identifier 408 of the wearable safety vest 400 of FIG. 4 collects acquires, and/or obtains location data (e.g., the location data 418 of FIG. 4) associated with the wearable safety vest 400 of FIG. 4 (block 802). Following block 802, control of the example method 800 of FIG. 8 proceeds to block 804.

At block 804, the radio transmitter 404 of the wearable safety vest 400 of FIG. 4 transmits the location data to the operations management apparatus 200 of FIG. 2 (block 804). Following block 804, control of the example method 800 of FIG. 8 proceeds to block 806.

At block 806, the controller 410 of the wearable safety vest 400 of FIG. 4 determines whether any control signal(s) have been received from the operations management apparatus 200 of FIG. 2 (e.g., via the radio receiver 406 of the wearable safety vest 400 of FIG. 4) to present one or more alert(s) at the wearable safety vest 400 of FIG. 4 (block 806). If the controller 410 of FIG. 4 determines at block 806 that no control signal(s) have been received from the operations management apparatus 200 of FIG. 2 to present one or more alert(s) at the wearable safety vest 400 of FIG. 4, control of the example method 800 of FIG. 8 returns to block 802. If the controller 410 of FIG. 4 instead determines at block 806 that one or more control signal(s) have been received from the operations management apparatus 200 of FIG. 2 to present one or more alert(s) at the wearable safety vest 400 of FIG. 4, control of the example method 800 of FIG. 8 proceeds to block 808.

At block 808, the controller 410 of the wearable safety vest 400 of FIG. 4 presents one or more alert(s) of the wearable safety vest 400 of FIG. 4 via one or more of the alert device(s) 412 of the wearable safety vest 400 of FIG. 4 based on the one or more control signal(s) (e.g., the control signal data 420 of FIG. 4) received from the operations management apparatus 200 of FIG. 2 (block 808). Following block 808, control of the example method 800 of FIG. 8 proceeds to block 810.

At block 810, the controller 410 of the wearable safety vest 400 of FIG. 4 determines whether to discontinue operating the wearable safety vest 400 of FIG. 4 (block 810). For example, the controller 410 may receive one or more control signal(s) indicating that operation of the wearable safety vest 400 of FIG. 4 is to cease. If the controller 410 of FIG. 4 determines at block 810 that operation of the wearable safety vest 400 of FIG. 4 is not to be discontinued, control of the example method 800 of FIG. 8 returns to block 802. If the controller 310 of FIG. 3 instead determines at block 810 that operation of the wearable safety vest 400 of FIG. 4 is to be discontinued, the example method 800 of FIG. 8 ends.

Figure 9:
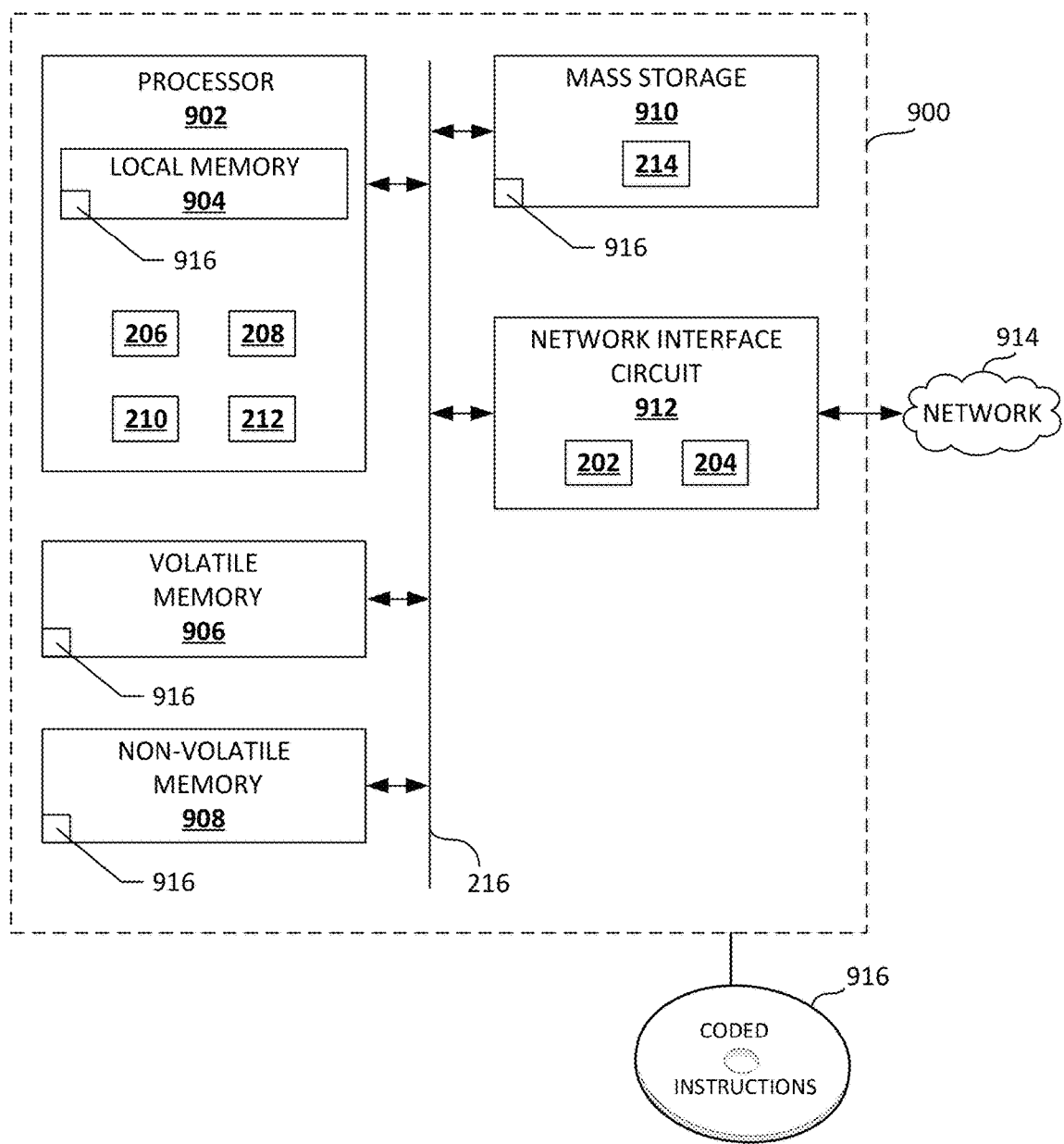
FIG. 9 is an example processor platform capable of executing instructions to implement the example methods of FIGS. 5, 6A and 6B and the example operations management apparatus of FIG. 2.

FIG. 9 is an example processor platform 900 capable of executing instructions to implement the example method 500 of FIG. 5 and/or the example method 600 of FIGS. 6A and 6B, and the example operations management apparatus 200 of FIG. 2. The processor platform 900 of the illustrated example includes a processor 902. The processor 902 of the illustrated example is hardware. For example, the processor 902 can be implemented by one or more integrated circuit(s), logic circuit(s), microprocessor(s), controller(s), or microcontroller(s) from any desired family or manufacturer. In the example of FIG. 9, the processor 902 implements the example travel determiner 206, the example collision probability determiner 208, the example safety manager 210, and the example control signal generator 212 of FIG. 2. The processor 902 of the illustrated example also includes a local memory 904 (e.g., a cache).

The processor 902 of the illustrated example is in communication with a main memory including a volatile memory 906 and a non-volatile memory 908 via a bus (e.g., the bus 216 of FIG. 2). The volatile memory 906 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 908 may be implemented by flash memory and/or any other desired type of memory device. Access to the volatile memory 906 and the non-volatile memory 908 is controlled by a memory controller.

The processor 902 of the illustrated example is also in communication with one or more mass storage device(s) 910 for storing software and/or data. Examples of such mass storage device(s) 910 include floppy disk drives, hard drive disks, compact disk drives, Blu-ray disk drives, RAID systems, and digital versatile disk (DVD) drives. In the illustrated example, the mass storage device 910 includes the example memory 214 of FIG. 2.

The processor platform 900 of the illustrated example also includes a network interface circuit 912. The network interface circuit 912 may be implemented by any type of interface standard, such as an Ethernet interface, a universal serial bus (USB), and/or a PCI express interface. The network interface circuit 912 of the illustrated example includes the example radio transmitter 202 and the example radio receiver 204 of FIG. 2, and may further include a communication device such as a modem and/or network interface card to facilitate exchange of data with one or more external machine(s) (e.g., the automated machine 300 of FIG. 3 and/or the wearable safety vest 400 of FIG. 4) via a network 914 (e.g., a wireless network, a radio network, a cellular network, etc.).

Coded instructions 916 for implementing the example method 500 of FIG. 5 and/or the example method 600 of FIGS. 6A and 6B may be stored in the local memory 904, in the volatile memory 906, in the non-volatile memory 908, in the mass storage device 910, and/or on a removable tangible computer readable storage medium such as a CD or DVD.

Figure 10:
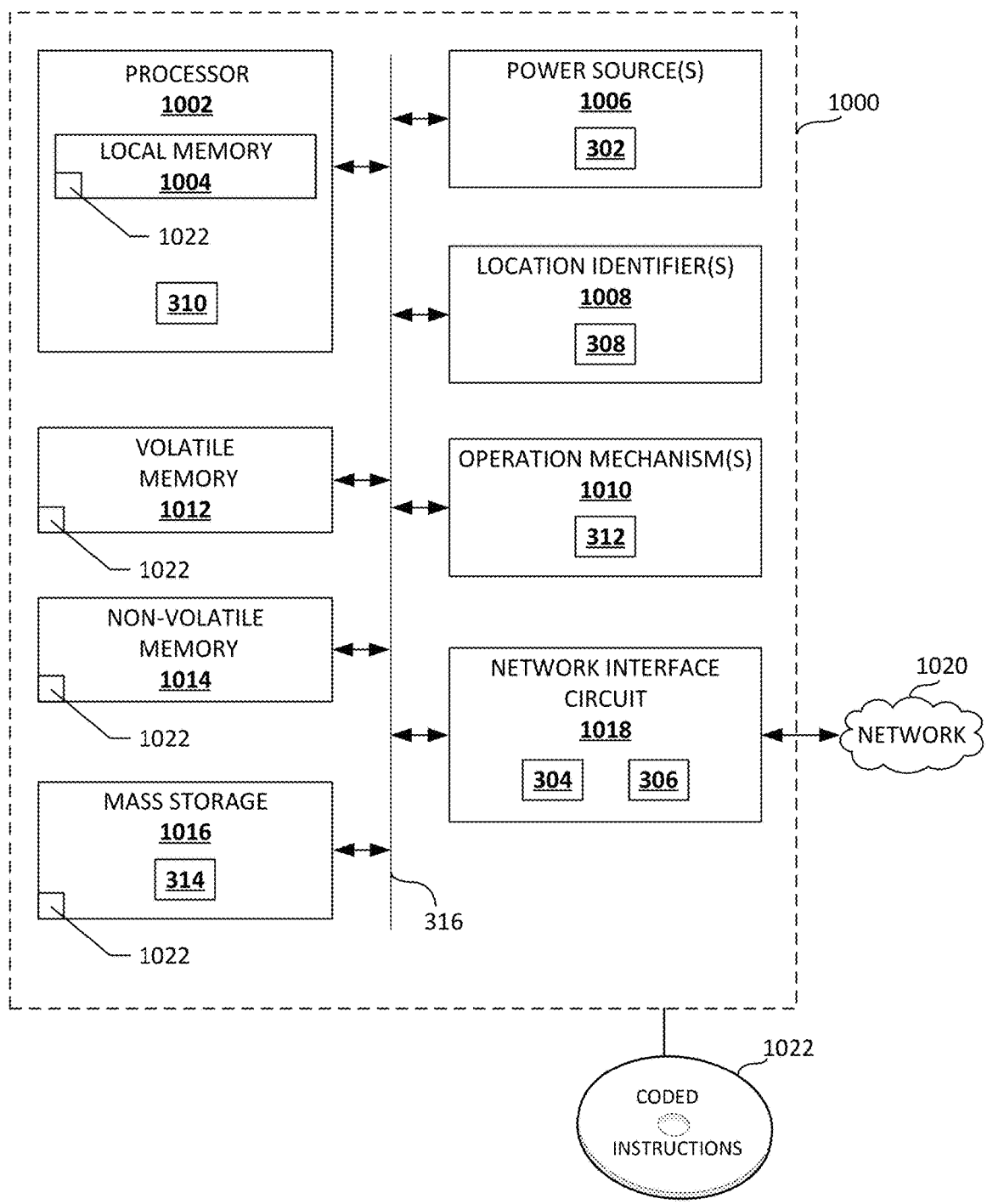
FIG. 10 is an example processor platform capable of executing instructions to implement the example method of FIG. 7 and the example automated machine of FIG. 3.

FIG. 10 is an example processor platform 1000 capable of executing instructions to implement the example method 700 of FIG. 7 and the example automated machine 300 of FIG. 3. The processor platform 1000 of the illustrated example includes a processor 1002. The processor 1002 of the illustrated example is hardware. For example, the processor 1002 can be implemented by one or more integrated circuit(s), logic circuit(s), microprocessor(s), controller(s), or microcontroller(s) from any desired family or manufacturer. In the example of FIG. 10, the processor 1002 implements the example controller 310 of FIG. 3. The processor 1002 of the illustrated example also includes a local memory 1004 (e.g., a cache).

The processor 1002 of the illustrated example is in communication with one or more power source(s) 1006 via a bus (e.g., the bus 316 of FIG. 3). In the example of FIG. 10, the power source(s) 1006 include the example power source 302 of FIG. 3. The processor 1002 of the illustrated example is also in communication with one or more location identifier(s) 1008 via the bus. In the example of FIG. 10, the location identifier(s) 1008 include the example location identifier 308 of FIG. 3. The processor 1002 of the illustrated example is also in communication with one or more operation mechanism(s) 1010 via the bus. In the example of FIG. 10, the operation mechanism(s) 1010 include the example operation mechanism(s) 312 of FIG. 3.

The processor 1002 of the illustrated example is also in communication with a main memory including a volatile memory 1012 and a non-volatile memory 1014 via the bus. The volatile memory 1012 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1014 may be implemented by flash memory and/or any other desired type of memory device. Access to the volatile memory 1012 and the non-volatile memory 1014 is controlled by a memory controller.

The processor 1002 of the illustrated example is also in communication with one or more mass storage device(s) 1016 for storing software and/or data. Examples of such mass storage device(s) 1016 include floppy disk drives, hard drive disks, compact disk drives, Blu-ray disk drives, RAID systems, and digital versatile disk (DVD) drives. In the illustrated example, the mass storage device 1016 includes the example memory 314 of FIG. 3.

The processor platform 1000 of the illustrated example also includes a network interface circuit 1018. The network interface circuit 1018 may be implemented by any type of interface standard, such as an Ethernet interface, a universal serial bus (USB), and/or a PCI express interface. The network interface circuit 1018 of the illustrated example includes the example radio transmitter 304 and the example radio receiver 306 of FIG. 3, and may further include a communication device such as a modem and/or network interface card to facilitate exchange of data with one or more external machine(s) (e.g., the operations management apparatus 200 of FIG. 2) via a network 1020 (e.g., a wireless network, a radio network, a cellular network, etc.).

Coded instructions 1022 for implementing the example method 700 of FIG. 7 may be stored in the local memory 1004, in the volatile memory 1012, in the non-volatile memory 1014, in the mass storage device 1016, and/or on a removable tangible computer readable storage medium such as a CD or DVD.

Figure 11:
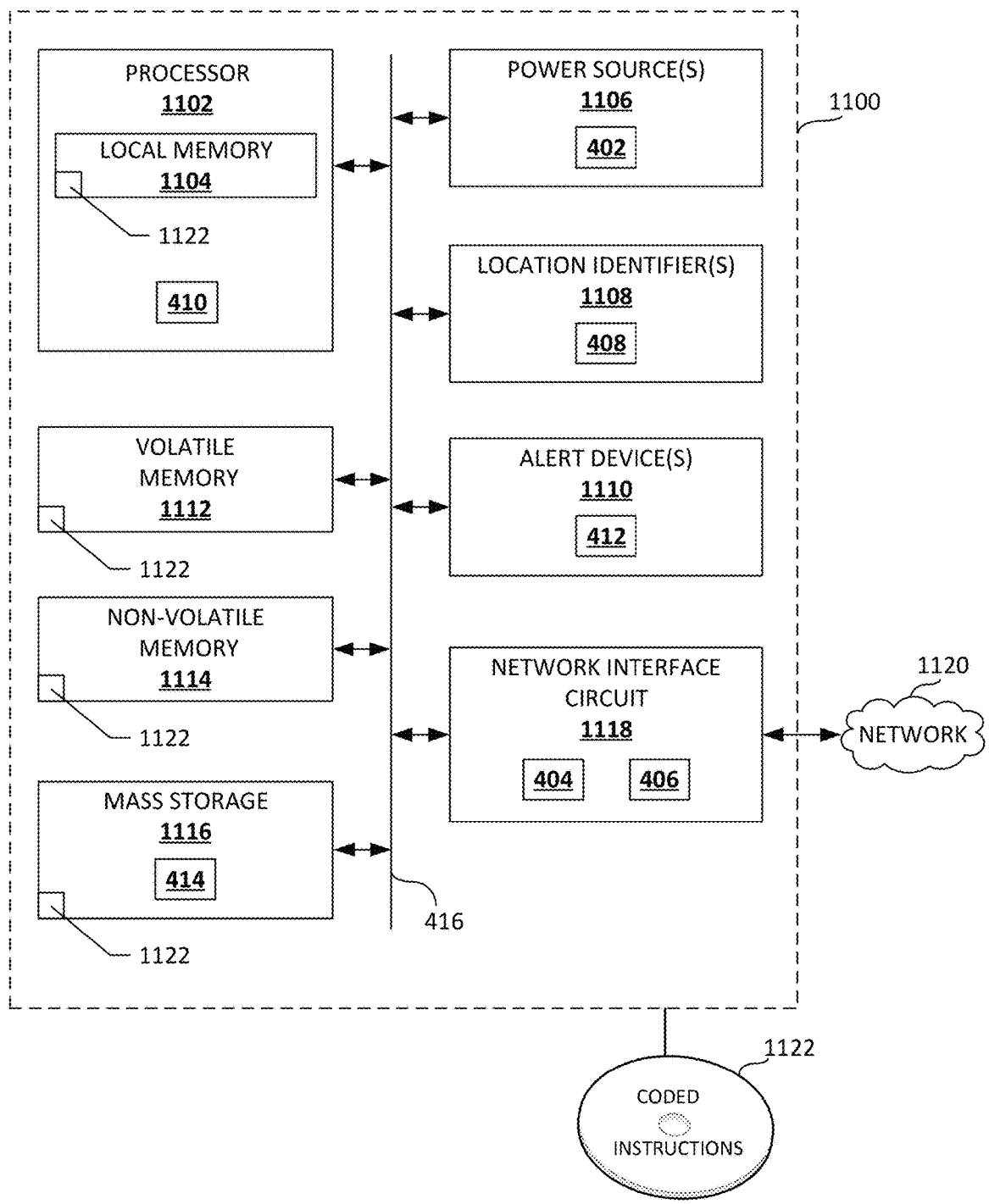
FIG. 11 is an example processor platform capable of executing instructions to implement the example method of FIG. 8 and the example wearable safety vest of FIG. 4.

FIG. 11 is an example processor platform 1100 capable of executing instructions to implement the example method 800 of FIG. 8 and the example wearable safety vest 400 of FIG. 4. The processor platform 1100 of the illustrated example includes a processor 1102. The processor 1102 of the illustrated example is hardware. For example, the processor 1102 can be implemented by one or more integrated circuit(s), logic circuit(s), microprocessor(s), controller(s), or microcontroller(s) from any desired family or manufacturer. In the example of FIG. 11, the processor 1102 implements the example controller 410 of FIG. 4. The processor 1102 of the illustrated example also includes a local memory 1104 (e.g., a cache).

The processor 1102 of the illustrated example is in communication with one or more power source(s) 1106 via a bus (e.g., the bus 416 of FIG. 4). In the example of FIG. 11, the power source(s) 1106 include the example power source 402 of FIG. 4. The processor 1102 of the illustrated example is also in communication with one or more location identifier(s) 1108 via the bus. In the example of FIG. 11, the location identifier(s) 1108 include the example location identifier 408 of FIG. 4. The processor 1102 of the illustrated example is also in communication with one or more alert device(s) 1110 via the bus. In the example of FIG. 11, the alert device(s) 1110 include the example alert device(s) 412 of FIG. 4.

The processor 1102 of the illustrated example is also in communication with a main memory including a volatile memory 1112 and a non-volatile memory 1114 via the bus. The volatile memory 1112 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1114 may be implemented by flash memory and/or any other desired type of memory device. Access to the volatile memory 1112 and the non-volatile memory 1114 is controlled by a memory controller.

The processor 1102 of the illustrated example is also in communication with one or more mass storage device(s) 1116 for storing software and/or data. Examples of such mass storage device(s) 1116 include floppy disk drives, hard drive disks, compact disk drives, Blu-ray disk drives, RAID systems, and digital versatile disk (DVD) drives. In the illustrated example, the mass storage device 1116 includes the example memory 414 of FIG. 4.

The processor platform 1100 of the illustrated example also includes a network interface circuit 1118. The network interface circuit 1118 may be implemented by any type of interface standard, such as an Ethernet interface, a universal serial bus (USB), and/or a PCI express interface. The network interface circuit 1118 of the illustrated example includes the example radio transmitter 404 and the example radio receiver 406 of FIG. 4, and may further include a communication device such as a modem and/or network interface card to facilitate exchange of data with one or more external machine(s) (e.g., the operations management apparatus 200 of FIG. 2) via a network 1120 (e.g., a wireless network, a radio network, a cellular network, etc.).

Coded instructions 1122 for implementing the example method 800 of FIG. 8 may be stored in the local memory 1104, in the volatile memory 1112, in the non-volatile memory 1114, in the mass storage device 1116, and/or on a removable tangible computer readable storage medium such as a CD or DVD.

From the foregoing, it will be appreciated that the disclosed methods and apparatus advantageously reduce probabilities of collisions between humans and automated machines operating within a workplace. In some examples, the disclosed methods and apparatus control the respective operations of one or more automated machine(s) located and/or traveling within a workplace based on location data and/or travel data collected, acquired, and/or received from one or more wearable safety vest(s) worn by and/or otherwise associated with corresponding ones of one or more human(s) located and/or traveling within the workplace, and further based on location data and/or travel data collected, acquired, and/or received from the one or more automated machine(s) located and/or traveling within the workplace. In some examples, the disclosed methods and apparatus additionally or alternatively control the presentation of one or more alert(s) at respective ones of the one or more wearable safety vest(s) located and/or traveling within the workplace based on the aforementioned location data and/or travel data associated with the one or more automated machine(s) and the one or more wearable safety vest(s).

In some examples, an apparatus is disclosed. In some disclosed examples, the apparatus comprises a collision probability determiner to determine a first probability of collision between an automated machine and a wearable safety vest. In some disclosed examples, the apparatus comprises a safety manager to determine whether the first probability of collision exceeds a probability of collision threshold. In some disclosed examples, the apparatus comprises a control signal generator to generate a first control signal in response to the safety manager determining that the first probability of collision exceeds the probability of collision threshold. In some disclosed examples, the first control signal is to be transmitted to the automated machine to adjust an operation of the automated machine.

In some disclosed examples of the apparatus, the first probability of collision is based on travel data including first travel data associated with the automated machine and second travel data associated with the wearable safety vest. In some disclosed examples, the first travel data is based on first location data associated with the automated machine, and the second travel data is based on second location data associated with the wearable safety vest. In some disclosed examples, the first travel data includes a first location, a first direction of travel, and a first rate of travel associated with the automated machine, and the second travel data includes a second location, a second direction of travel, and a second rate of travel associated with the wearable safety vest.

In some disclosed examples of the apparatus, the control signal generator is to generate a second control signal in response to the safety manager determining that the first probability of collision exceeds the probability of collision threshold. In some disclosed examples, the second control signal is to be transmitted to the wearable safety vest to present an alert at the wearable safety vest. In some disclosed examples, the alert is one of a visual alert, an audible alert, or a tactile alert.

In some disclosed examples of the apparatus, the collision probability determiner is to determine a second probability of collision between the automated machine and the wearable safety vest in response to the control signal generator generating the first control signal. In some disclosed examples, the safety manager is to determine whether the second probability of collision exceeds the probability of collision threshold. In some disclosed examples, the control signal generator is to generate a second control signal in response to the safety manager determining that the second probability of collision exceeds the probability of collision threshold. In some disclosed examples, the second control signal is to be transmitted to the wearable safety vest to present an alert at the wearable safety vest.

In some examples, a method is disclosed. In some disclosed examples, the method comprises determining, by executing one or more instructions with a processor, a first probability of collision between an automated machine and a wearable safety vest. In some disclosed examples, the method comprises generating, by executing one or more instructions with the processor, a first control signal in response to determining that the first probability of collision exceeds a probability of collision threshold. In some disclosed examples, the first control signal is to be transmitted to the automated machine to adjust an operation of the automated machine.

In some disclosed examples of the method, the first probability of collision is based on travel data including first travel data associated with the automated machine and second travel data associated with the wearable safety vest. In some disclosed examples, the first travel data is based on first location data associated with the automated machine, and the second travel data is based on second location data associated with the wearable safety vest. In some disclosed examples, the first travel data includes a first location, a first direction of travel, and a first rate of travel associated with the automated machine, and the second travel data includes a second location, a second direction of travel, and a second rate of travel associated with the wearable safety vest.

In some disclosed examples, the method further comprises generating, by executing one or more instructions with the processor, a second control signal in response to determining that the first probability of collision exceeds the probability of collision threshold. In some disclosed examples, the second control signal is to be transmitted to the wearable safety vest to present an alert at the wearable safety vest. In some disclosed examples, the alert is one of a visual alert, an audible alert, or a tactile alert.

In some disclosed examples, the method further comprises determining, by executing one or more instructions with a processor, a second probability of collision between the automated machine and the wearable safety vest in response to generating the first control signal. In some disclosed examples, the method further comprises generating, by executing one or more instructions with the processor, a second control signal in response to determining that the second probability of collision exceeds the probability of collision threshold. In some disclosed examples, the second control signal is to be transmitted to the wearable safety vest to present an alert at the wearable safety vest.

In some examples, a non-transitory machine readable storage medium comprising instructions is disclosed. In some disclosed examples, the instructions, when executed, cause a processor to determine a first probability of collision between an automated machine and a wearable safety vest. In some disclosed examples, the instructions, when executed, cause the processor to generate a first control signal in response to determining that the first probability of collision exceeds a probability of collision threshold. In some disclosed examples, the first control signal is to be transmitted to the automated machine to adjust an operation of the automated machine.

In some disclosed examples of the non-transitory machine readable storage medium, the first probability of collision is based on travel data including first travel data associated with the automated machine and second travel data associated with the wearable safety vest. In some disclosed examples, the first travel data is based on first location data associated with the automated machine, and the second travel data is based on second location data associated with the wearable safety vest. In some disclosed examples, the first travel data includes a first location, a first direction of travel, and a first rate of travel associated with the automated machine, and the second travel data includes a second location, a second direction of travel, and a second rate of travel associated with the wearable safety vest.

In some disclosed examples of the non-transitory machine readable storage medium, the instructions, when executed, further cause the processor to generate a second control signal in response to determining that the first probability of collision exceeds the probability of collision threshold. In some disclosed examples, the second control signal is to be transmitted to the wearable safety vest to present an alert at the wearable safety vest. In some disclosed examples, the alert is one of a visual alert, an audible alert, or a tactile alert.

In some disclosed examples of the non-transitory machine readable storage medium, the instructions, when executed, further cause the processor to determine a second probability of collision between the automated machine and the wearable safety vest in response to generating the first control signal. In some disclosed examples, the instructions, when executed, further cause the processor to generate a second control signal in response to determining that the second probability of collision exceeds the probability of collision threshold. In some disclosed examples, the second control signal is to be transmitted to the wearable safety vest to present an alert at the wearable safety vest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An operations management apparatus located within a workplace, the operations management apparatus comprising:
   a control signal generator configured to generate control signals for controlling directions of travel and rates of travel of respective ones of a plurality of unmanned automated guided vehicles located within a geofence of the workplace and moving relative to one another in a automated manner while performing corresponding workplace operations within the geofence;
   a radio transmitter configured to transmit a first control signal generated via the control signal generator from the operations management apparatus to a first unmanned automated guided vehicle from among the plurality of unmanned automated guided vehicles, the first unmanned automated guided vehicle configured to move in a first direction of travel and at a first rate of travel within the geofence in response to receiving the first control signal;
   a collision probability determiner configured to determine, subsequent to transmission of the first control signal, a first probability of collision between the first unmanned automated guided vehicle and a wearable safety vest located within the geofence; and
   a safety manager configured to determine whether the first probability of collision exceeds a probability of collision threshold, the control signal generator configured to generate a second control signal in response to the safety manager determining that the first probability of collision exceeds the probability of collision threshold, the radio transmitter configured to transmit the second control signal from the operations management apparatus to the first unmanned automated guided vehicle, the first unmanned automated guided vehicle configured to move in a second direction of travel and at a second rate of travel within the geofence in response to receiving the second control signal, at least one of the second direction of travel or the second rate of travel of the first unmanned automated guided vehicle differing from a corresponding one of the first direction of travel or the first rate of travel of the first unmanned automated guided vehicle in a manner that reduces the first probability of collision.

2. The operations management apparatus of claim 1, wherein the first probability of collision is based on travel data including first travel data associated with the first unmanned automated guided vehicle and second travel data associated with the wearable safety vest.

3. The operations management apparatus of claim 2, wherein the first travel data is based on first location data associated with the first unmanned automated guided vehicle, and the second travel data is based on second location data associated with the wearable safety vest.

4. The operations management apparatus of claim 2, wherein the first travel data includes a first location, a first direction of travel, and a first rate of travel associated with the first unmanned automated guided vehicle, and the second travel data includes a second location, a second direction of travel, and a second rate of travel associated with the wearable safety vest.

5. The operations management apparatus of claim 1, wherein the control signal generator is configured to generate a third control signal in response to the safety manager determining that the first probability of collision exceeds the probability of collision threshold, the radio transmitter is configured to transmit the third control signal from the operations management apparatus to the wearable safety vest, and the wearable safety vest is configured to present an alert in response to receiving the third control signal.

6. The operations management apparatus of claim 5, wherein the alert is one of a visual alert, an audible alert, or a tactile alert.

7. The operations management apparatus of claim 1, wherein the collision probability determiner is configured to determine a second probability of collision between the first unmanned automated guided vehicle and the wearable safety vest in response to the radio transmitter transmitting the second control signal to the first unmanned automated guided vehicle, the safety manager is configured to determine whether the second probability of collision exceeds the probability of collision threshold, the control signal generator is configured to generate a third control signal in response to the safety manager determining that the second probability of collision exceeds the probability of collision threshold, the radio transmitter is configured to transmit the third control signal from the operations management apparatus to the wearable safety vest, and the wearable safety vest is configured to present an alert in response to receiving the third control signal.

8. A method for managing operations occurring within a workplace, the method comprising:

generating, by executing one or more instructions with a processor of an operations management apparatus located within the workplace, control signals for controlling directions of travel and rates of travel of respective ones of a plurality of unmanned automated guided vehicles located within a geofence of the workplace and moving relative to one another in a automated manner while performing corresponding workplace operations within the geofence;

transmitting, via a radio transmitter of the operations management apparatus, a first control signal generated via the processor from the operations management apparatus to a first unmanned automated guided vehicle from among the plurality of unmanned automated guided vehicles, the first unmanned automated guided vehicle moving in a first direction of travel and at a first rate of travel within the geofence in response to receiving the first control signal;

determining, by executing one or more instructions with the processor subsequent to the transmitting of the first control signal, a first probability of collision between the first unmanned automated guided vehicle and a wearable safety vest located within the geofence;

generating, by executing one or more instructions with the processor, a second control signal in response to determining that the first probability of collision exceeds a probability of collision threshold; and transmitting, via the radio transmitter, the second control signal from the operations management apparatus to the first unmanned automated guided vehicle, the first unmanned automated guided vehicle moving in a second direction of travel and at a second rate of travel within the geofence in response to receiving the second control signal, at least one of the second direction of travel or the second rate of travel of the first unmanned automated guided vehicle differing from a corresponding one of the first direction of travel or the first rate of travel of the first unmanned automated guided vehicle in a manner that reduces the first probability of collision.

9. The method of claim 8, wherein the first probability of collision is based on travel data including first travel data associated with the first unmanned automated guided vehicle and second travel data associated with the wearable safety vest.

10. The method of claim 9, wherein the first travel data is based on first location data associated with the first unmanned automated guided vehicle, and the second travel data is based on second location data associated with the wearable safety vest.

11. The method of claim 9, wherein the first travel data includes a first location, a first direction of travel, and a first rate of travel associated with the first unmanned automated guided vehicle, and the second travel data includes a second location, a second direction of travel, and a second rate of travel associated with the wearable safety vest.

12. The method of claim 8, further comprising:

generating, by executing one or more instructions with the processor, a third control signal in response to determining that the first probability of collision exceeds the probability of collision threshold; and transmitting, via the radio transmitter, the third control signal from the operations management apparatus to the wearable safety vest, the wearable safety vest presenting an alert in response to receiving the third control signal.

13. The method of claim 12, wherein the alert is one of a visual alert, an audible alert, or a tactile alert.

14. The method of claim 8, further comprising:
determining, by executing one or more instructions with the processor, a second probability of collision between the first unmanned automated guided vehicle and the wearable safety vest in response to the transmitting of the second control signal to the first unmanned automated guided vehicle;
generating, by executing one or more instructions with the processor, a third control signal in response to determining that the second probability of collision exceeds the probability of collision threshold; and
transmitting, via the radio transmitter, the third control signal from the operations management apparatus to the wearable safety vest, the wearable safety vest presenting an alert in response to receiving the third control signal.

15. A non-transitory machine readable storage medium comprising instructions that, when executed, cause an operations management apparatus located within a workplace to at least:
generate, via a processor of the operations management apparatus, control signals for controlling directions of travel and rates of travel of respective ones of a plurality of unmanned automated guided vehicles located within a geofence of the workplace and moving relative to one another in an automated manner while performing corresponding workplace operations within the geofence;
transmit, via a radio transmitter of the operations management apparatus, a first control signal generated via the processor from the operations management apparatus to a first unmanned automated guided vehicle from among the plurality of unmanned automated guided vehicles, the first unmanned automated guided vehicle moving in a first direction of travel and at a first rate of travel within the geofence in response to receiving the first control signal;
determine, via the processor and subsequent to the transmitting of the first control signal, a first probability of collision between the first unmanned automated guided vehicle and a wearable safety vest located within the geofence;
generate, via the processor, a second control signal in response to determining that the first probability of collision exceeds a probability of collision threshold; and
transmit, via the radio transmitter, the second control signal from the operations management apparatus to the first unmanned automated guided vehicle, the first unmanned automated guided vehicle moving in a second direction of travel and at a second rate of travel within the geofence in response to receiving the second control signal, at least one of the second direction of travel or the second rate of travel of the first unmanned automated guided vehicle differing from a corresponding one of the first direction of travel or the first rate of travel of the first unmanned automated guided vehicle in a manner that reduces the first probability of collision.

16. The non-transitory machine readable storage medium of claim 15, wherein the first probability of collision is based on travel data including first travel data associated with the first unmanned automated guided vehicle and second travel data associated with the wearable safety vest.

17. The non-transitory machine readable storage medium of claim 16, wherein the first travel data is based on first location data associated with the first unmanned automated guided vehicle, and the second travel data is based on second location data associated with the wearable safety vest.

18. The non-transitory machine readable storage medium of claim 16, wherein the first travel data includes a first location, a first direction of travel, and a first rate of travel associated with the first unmanned automated guided vehicle, and the second travel data includes a second location, a second direction of travel, and a second rate of travel associated with the wearable safety vest.

19. The non-transitory machine readable storage medium of claim 15, wherein the instructions, when executed, further cause the operations management apparatus to:
generate, via the processor, a third control signal in response to determining that the first probability of collision exceeds the probability of collision threshold; and
transmit, via the radio transmitter, the third control signal from the operations management apparatus to the wearable safety vest, the wearable safety vest presenting an alert in response to receiving the third control signal.

20. The non-transitory machine readable storage medium of claim 15, wherein the instructions, when executed, further cause the operations management apparatus to:
determine, via the processor, a second probability of collision between the first unmanned automated guided vehicle and the wearable safety vest in response to the transmitting of the second control signal to the first unmanned automated guided vehicle;
generate, via the processor, a third control signal in response to determining that the second probability of collision exceeds the probability of collision threshold; and
transmit, via the radio transmitter, the third control signal from the operations management apparatus to the wearable safety vest, the wearable safety vest presenting an alert in response to receiving the third control signal.

* * * * *